United States Patent

Takagi

[11] Patent Number: 5,309,193
[45] Date of Patent: May 3, 1994

[54] CAMERA WITH AUTOMATIC LIGHT ADJUSTING DEVICE

[75] Inventor: Tadao Takagi, Yokohama, Japan
[73] Assignee: Nikon Corporation, Tokyo, Japan
[21] Appl. No.: 875,652
[22] Filed: Apr. 29, 1992

[30] Foreign Application Priority Data

May 7, 1991 [JP] Japan .................................. 3-131780

[51] Int. Cl.⁵ .......................... G03B 15/05; G03B 7/08
[52] U.S. Cl. ...................................... 354/415; 354/432
[58] Field of Search ................... 354/415, 432, 412

[56] References Cited

U.S. PATENT DOCUMENTS

| | | | |
|---|---|---|---|
| Re. 32,437 | 6/1987 | Taniguchi et al. | 354/415 |
| 3,836,924 | 9/1974 | Kawasaki | 354/415 |
| 4,291,979 | 9/1981 | Yuasa et al. | 354/415 X |
| 4,373,793 | 2/1983 | Taniguchi et al. | 354/415 |
| 4,655,576 | 4/1987 | Yuasa et al. | 354/415 |
| 4,809,030 | 2/1989 | Takagi et al. | 354/414 |
| 5,164,759 | 11/1992 | Yausukawa | 354/415 |
| 5,172,157 | 12/1992 | Takagi | 354/415 |

FOREIGN PATENT DOCUMENTS 3139806  4/1983  Fed. Rep. of Germany .

Primary Examiner—Michael L. Gellner
Assistant Examiner—Jae N. Noh
Attorney, Agent, or Firm—Shapiro and Shapiro

[57] ABSTRACT

A camera provided with an automatic light adjusting device comprises a flash apparatus for performing a preliminary flash before a main flash, a light metering device for at least metering a light which is emitted from the flash apparatus and reflected by a photographic field, a light metered value correcting device for correcting a light metered value upon the preliminary flash by eliminating a component of stationary light excluding the light emitted from the flash apparatus and reflected by the photographic field, from the light metered value upon the preliminary flash which is metered by the light metering device, and a light adjusting device for adjusting the main flash of the flash apparatus based on the light metered value corrected by the light metered value correcting device.

6 Claims, 19 Drawing Sheets

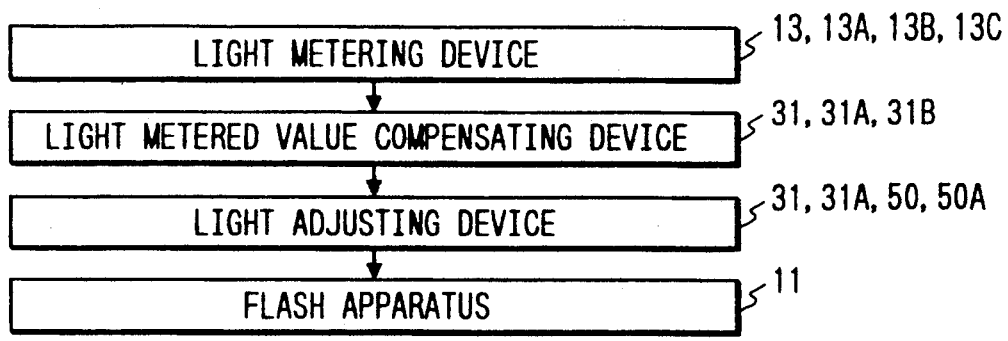
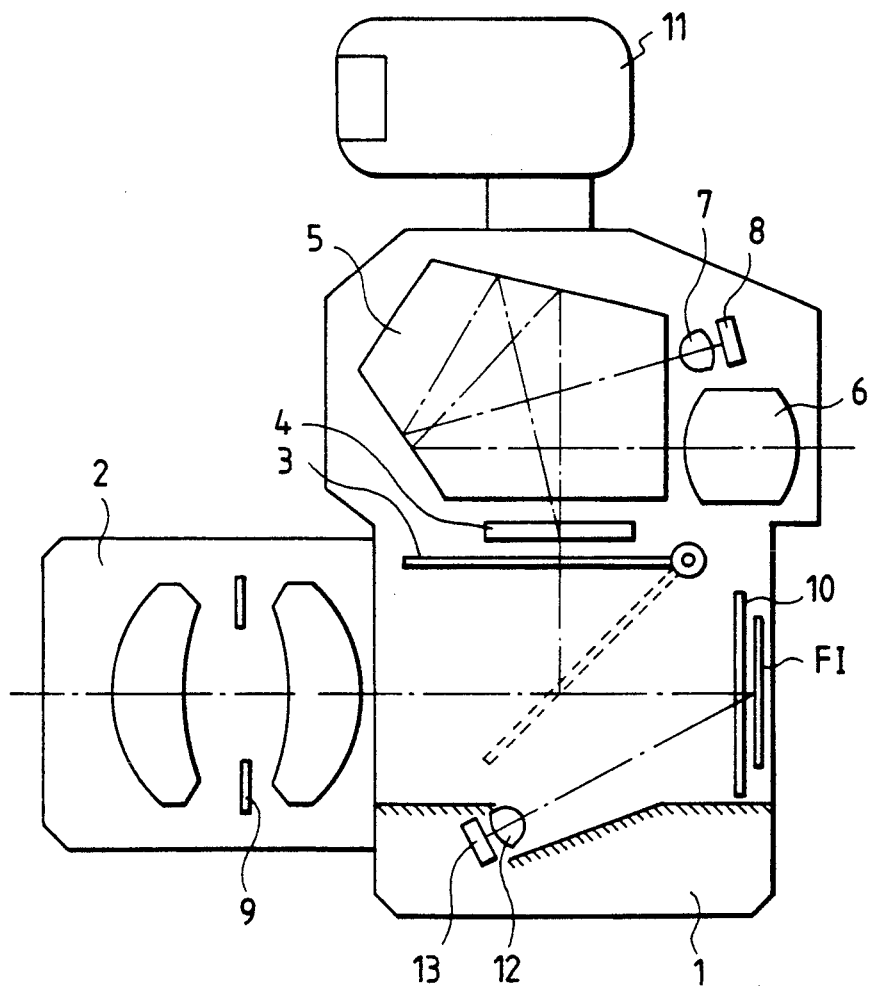

FROM FIG. 13

(E7) → Mval ← 1 (S412) → LIGHT ADJUSTING AREA (S413)

AREA OF WHICH GNrtn IS MAXIMUM IN Hi CUT AREAS. BUT, IN THE CASE OF A PLURALITY OF MAXIMUMS, AREA OF WHICH AREA NUMBER IS MINIMUM. (CENTER PRIORITY)

FROM FIG. 13

(E5) → Mval ← 1 (S414) → LIGHT ADJUSTING AREA (S415)

AREA OF WHICH GNrtn IS MINIMUM. BUT, IN THE CASE OF A PLURALITY OF MINIMUMS, AREA OF WHICH AREA NUMBER IS MINIMUM. (CENTER PRIORITY)

FROM FIG. 13

(E4) → Mval ← 1 (S416) → LIGHT ADJUSTING AREA (S417)

AREA OF WHICH GNrtn IS MAXIMUM. BUT, IN THE CASE OF A PLURALITY OF MAXIMUMS, AREA OF WHICH AREA NUMBER IS MINIMUM. (CENTER PRIORITY)

FROM FIG. 13

(E3) → Mval ← 5 (S418) → LIGHT ADJUSTING AREA (S419)

ALL FIVE AREAS

→ (E6) TO FIG. 16

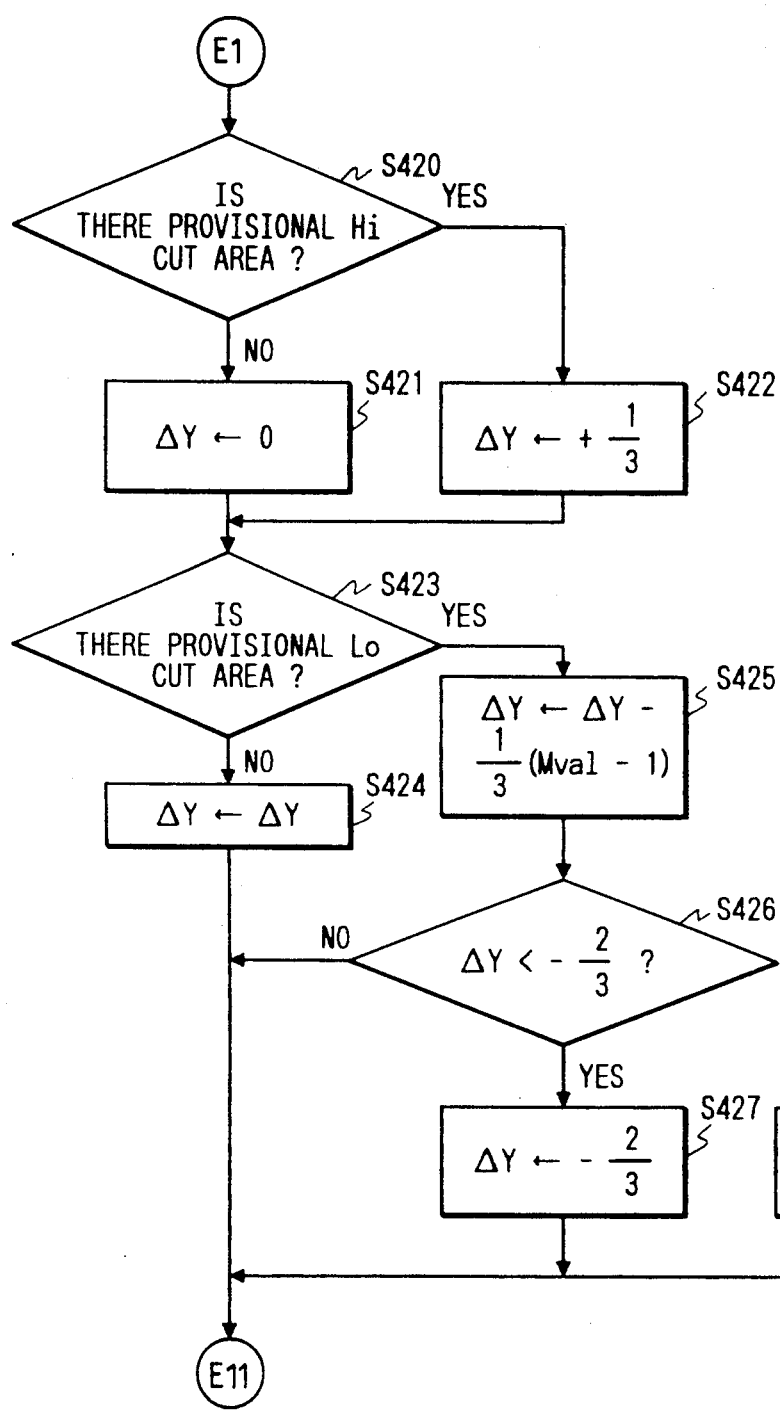

FIG. 16

FROM FIGS. 13 AND 14A
(E6)

S431: $Qgnr \leftarrow \sum_{n=1}^{5} \left(\dfrac{1}{GNrtn}\right)^2$

S432: $R(n) \leftarrow \dfrac{\left(\dfrac{1}{GNrtn}\right)^2}{Qgnr}$ (n = 1∼5)

S433: $n \leftarrow 0$

S434: $n \leftarrow n + 1$

S435: $R(n) \geq \dfrac{1}{5}$ ?
- NO → S437: $TR \leftarrow TR + 1/5 \cdot R(n)/MAX(R(n))$
- YES → S436: $TR \leftarrow TR + 1/5$ S438: n = 5 ?
- NO → back to S434
- YES → S439: $\Delta Y \leftarrow \log_2 \dfrac{TR}{1}$

FROM FIGS. 13 AND 14C
(E2)

FROM FIGS. 13 AND 14B
(E8)

S429: $\Delta Y \leftarrow -1$

S430: $\Delta Y \leftarrow +1.5$ (E10) TO FIG. 15

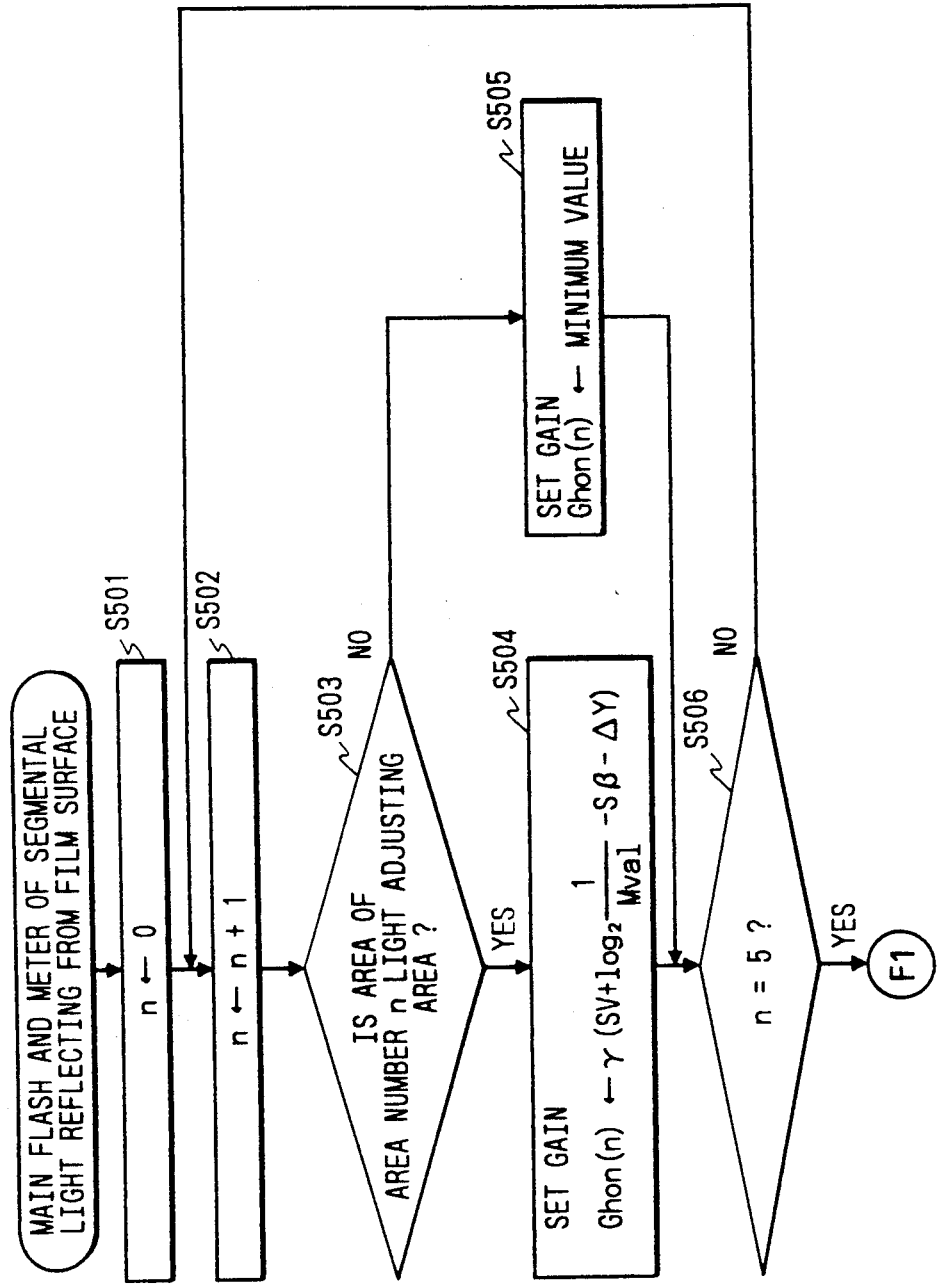

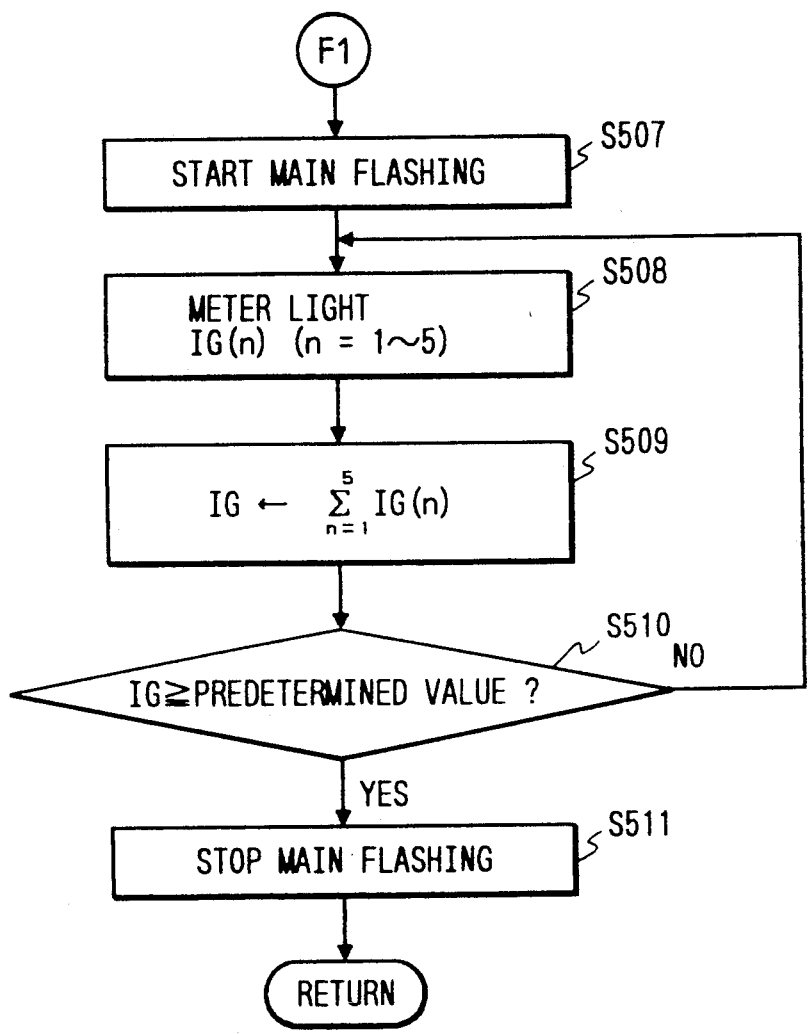

CAMERA WITH AUTOMATIC LIGHT ADJUSTING DEVICE

BACKGROUND OF THE INVENTION

1. Field of the Invention

The present invention relates to a camera provided with an automatic light adjusting device capable of use of flash apparatus which carries out a preliminary flash before a main flash.

2. Related Background Art

There has been proposed such a camera provided with an automatic light adjusting apparatus capable of use of flash apparatus which carries out a preliminary flash before a main flash (see for example, commonly assigned U.S. Ser. No. 560,745). In a camera of such type, a plurality of segmented photometric areas are used to meter a reflection light from a field to be photographed upon a preliminary flash in order to know a distribution and an intensity of reflection light from various objects in the photographic field based on photometric or light metering signals, thereby performing proper light adjustment upon the main flash.

In the above camera, a stationary light component such as natural light is also metered together with the reflection light component of preliminary flash emitted from a flash apparatus and reflected by the photographic field, upon light metering of preliminary flash. This results in inaccurate knowledge of the distribution and the intensity of reflection light from the photographic field, causing a problem of improper light adjustment upon the main flash. The influence becomes intensified as the brightness of background increases with increase in stationary light component.

SUMMARY OF THE INVENTION

It is an object of the present invention to provide a camera provided with an automatic light adjusting device, in which a reflection light component of flash apparatus is accurately detected upon a preliminary flash, a distribution and an intensity of reflection light of flash light from objects existing in a photographic field are accurately caught, and proper light adjustment is effected thereby upon a main flash.

Explaining the present invention with correspondence to FIG. 1, an embodiment of the present invention is directed to a camera provided with an automatic light adjusting device capable of use of flash apparatus 11, in which a preliminary flash is executed before a main flash.

The camera comprises a light metering device 13 for at least metering a light which is emitted from the flash apparatus 11 and reflected by a photographic field, a light metered value correcting device 31 for correcting a light metered value upon the preliminary flash by eliminating a component of stationary light excluding the light emitted from the flash apparatus 11 and reflected by the photographic field, from the light metered value upon the preliminary flash which is metered by the light metering device 13, and a light adjusting device 31, 50 for adjusting the main flash of the flash apparatus 11 based on the light metered value corrected by the light metered value correcting device 31, to achieve the above object.

In the present embodiment, a light metered value correcting device 31 corrects a light metered value upon the preliminary flash by eliminating a component of stationary light excluding the light emitted from the flash apparatus 11 and reflected by the photographic field, from the light metered value upon the preliminary flash which is metered by the light metering device 13, and a light adjusting device 31, 50 adjusts the main flash of the flash apparatus 11 based on the light metered value corrected by the light metered value correcting device 31.

In another embodiment, a light metering device 13A is provided to meter the stationary light component when the preliminary flash is not executed.

In the present embodiment, the light metering device 13A meters the stationary light component when the preliminary flash is not executed.

In still another embodiment, a light metering device 13B is provided to meter the stationary light component within the same time period as that required for the light metering of preliminary flash.

in the present invention, the light metering device 13B meters the stationary light component within the same time period as that required for the light metering of preliminary flash.

In still another embodiment, a light metered value correcting device 31A is provided to set a positive minimal value or zero as a corrected photometric or light metered value when the light metered value upon the preliminary flash of light metering device 13, 13A, 13B is negative after elimination of stationary light component.

In the present invention, the light metered value correcting device 31A sets a positive minimal value or zero as a corrected photometric value when the light metered value upon the preliminary flash of light metering device 13, 13A, 13B is negative after elimination of stationary light component.

In still another embodiment, there are provided a light metering device 13C for at least metering the light emitted from the flash apparatus 11 and reflected by the photographic field using a plurality of segmented areas of the photographic field, a light metered value correcting device 31B for correcting a light metered value for the each area by eliminating the stationary light component excluding the light emitted from the flash apparatus 11 and reflected by the photographic field, from a light metered value upon the preliminary flash of the each area, and a light adjusting device 31A, 50A for adjusting the main flash of the flash apparatus 11 based on the corrected light metered values of the areas.

In the present embodiment, the light metering device 13C at least meters the light emitted from the flash apparatus 11 and reflected by the photographic field using a plurality of segmented areas of the photographic field, the light metered value correcting device 31B corrects a light metered value for the each area by eliminating the stationary light component excluding the light emitted from the flash apparatus 11 and reflected by the photographic field, from a light metered value upon the preliminary flash of the each area, and the light adjusting device 31A, 50A adjusts the main flash of the flash apparatus 11 based on the corrected light metered values of the areas.

BRIEF DESCRIPTION OF THE DRAWINGS

FIG. 1 is a drawing to show a schematic structure of an automatic light adjusting device according to the present invention;

FIG. 2 is a sectional view of a TTL automatic light adjusting camera according to the present invention;

FIGS. 14A, 14B, 14C, and 14D are flowcharts to show routines for determination of light adjusting area and for calculation of light adjusting correction amount;

FIG. 15 is a flowchart to show a routine for determination of light adjusting area and for calculation of light adjusting correction amount;

FIG. 16 is a flowchart to show a routine for determination of light adjusting area and for calculation of light adjusting correction amount;

FIG. 19 is a flowchart to show a routine for main flash and light adjusting control; and FIG. 20 is a flowchart to show a routine for main flash and light adjusting control.

DETAILED DESCRIPTION OF THE PREFERRED EMBODIMENTS

Figure 3:
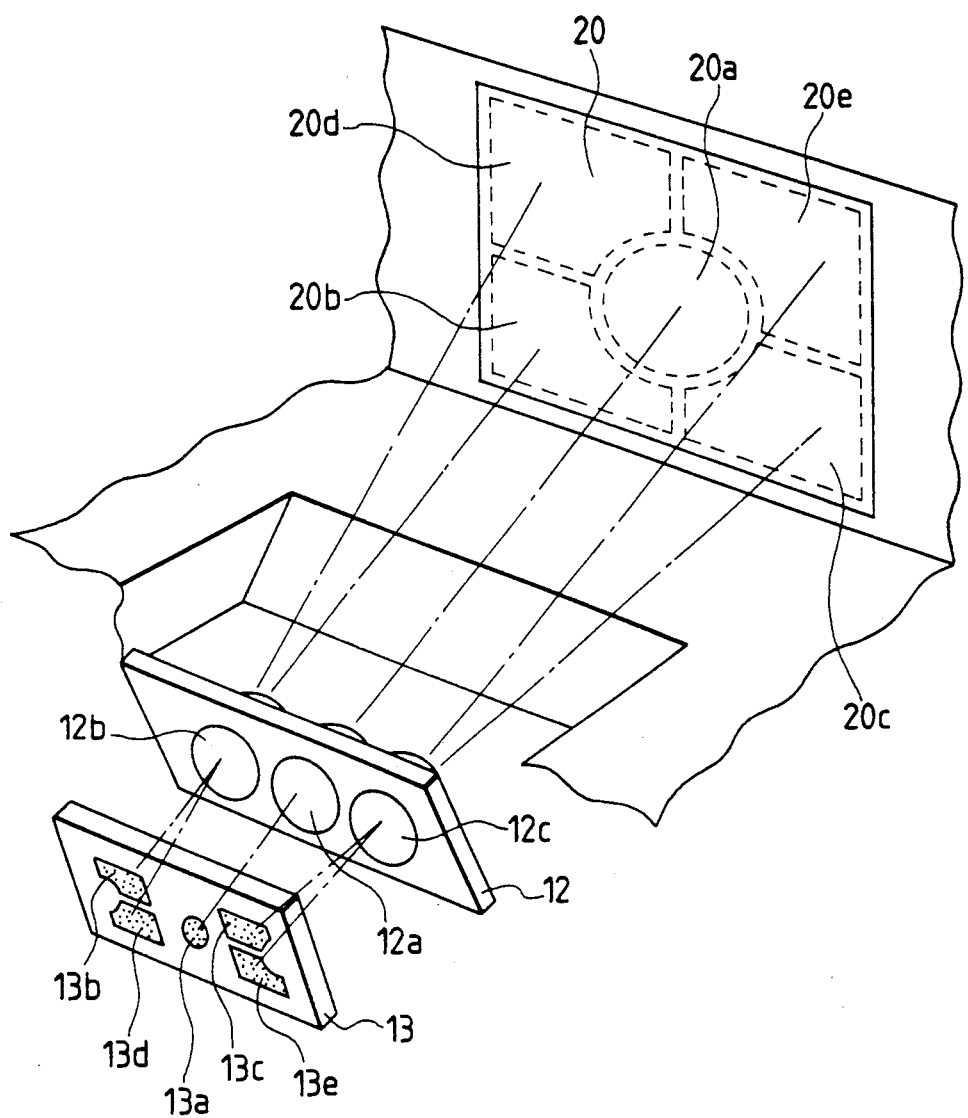
FIG. 3 is a perspective view to show a positional relation among a condenser lens array, light receiving element for light adjustment, and a film.

FIG. 2 is a sectional view of a TTL automatic light adjusting camera according to the present invention.

A photographic lens 2 and a later-described electronic flash apparatus may be set onto a camera body 1. Upon viewing through a finder, an optical flux or stationary light passed through the photographic lens 2 is reflected by a mirror 3 in a down position as shown by a broken line, then passes through a screen 4 and a pentaprism 5, a part of which is guided to an eye piece 6, and the other part of which passes through a condenser lens 7 to be guided to a light metering element for exposure calculation 8. Upon photographing, a later-described shutter release button is released to drive the mirror 3 to an up position as shown by a solid line in FIG. 2, an aperture 9 is stopped down, and a shutter 10 is opened. Then the optical flux passed through the photographic lens 2 is guided to a film FI for exposure.

Upon flash light photographing, an electronic flash apparatus 11 performs a main flash after the opening of shutter 10 to illuminate a subject, and a light reflected by the subject passes through the photographic lens 2 to reach a plane of film FI. A part of optical flux reflected by the plane of film FI is guided through the condenser lens array 12 to a light receiving element for adjusting light 13, and received by the light receiving element for adjusting light 13. Further, the camera of the present embodiment is capable of preliminary flash to check a condition of photographic field before the main flash. The light reflected from the photographic field upon the preliminary flash is reflected by a blind surface of shutter 10 before opening of shutter 10, and received by the light receiving element for adjusting light 13.

The light receiving element for adjusting light 13 is comprised of a light receiving element segment 13a and light receiving element segments 13b–13e on a common plane, as shown in FIG. 3. The light receiving element segment 13a corresponds to a disk light metering area at the center of the photographic field. The light receiving element segments 13b–13e correspond to light metering areas respectively having a shape of a rectangle lacking a corner arc, at a periphery of the photographic field. Therefore, the light receiving element for adjusting light 13 performs segmental photometry of five photometric areas of the photographic field. A condenser lens array 12 is an optical member having three lens portions 12a–12c corresponding to left, middle, and right blocks of light receiving element segments 13a–13e. If an exposure area 20 of one frame on the film plane is divided into five areas comprised of a central disk 20a and quarterly divided peripheries 20b–20e similarly as the photographic field as shown in FIG. 3, the left, middle, and right blocks of light receiving elements 13a–13e oppose left, central, and right parts of film exposure area 20 via the three lens portions 12a–12c of condenser lens array 12, as respectively shown by broken lines in FIG. 3. Since the segmented light receiving element 13 is approximately conjugate with the film exposure area 20, respective brightnesses of five areas 20a–20e may be metered with the segments divided in almost identical shape.

Figure 4:
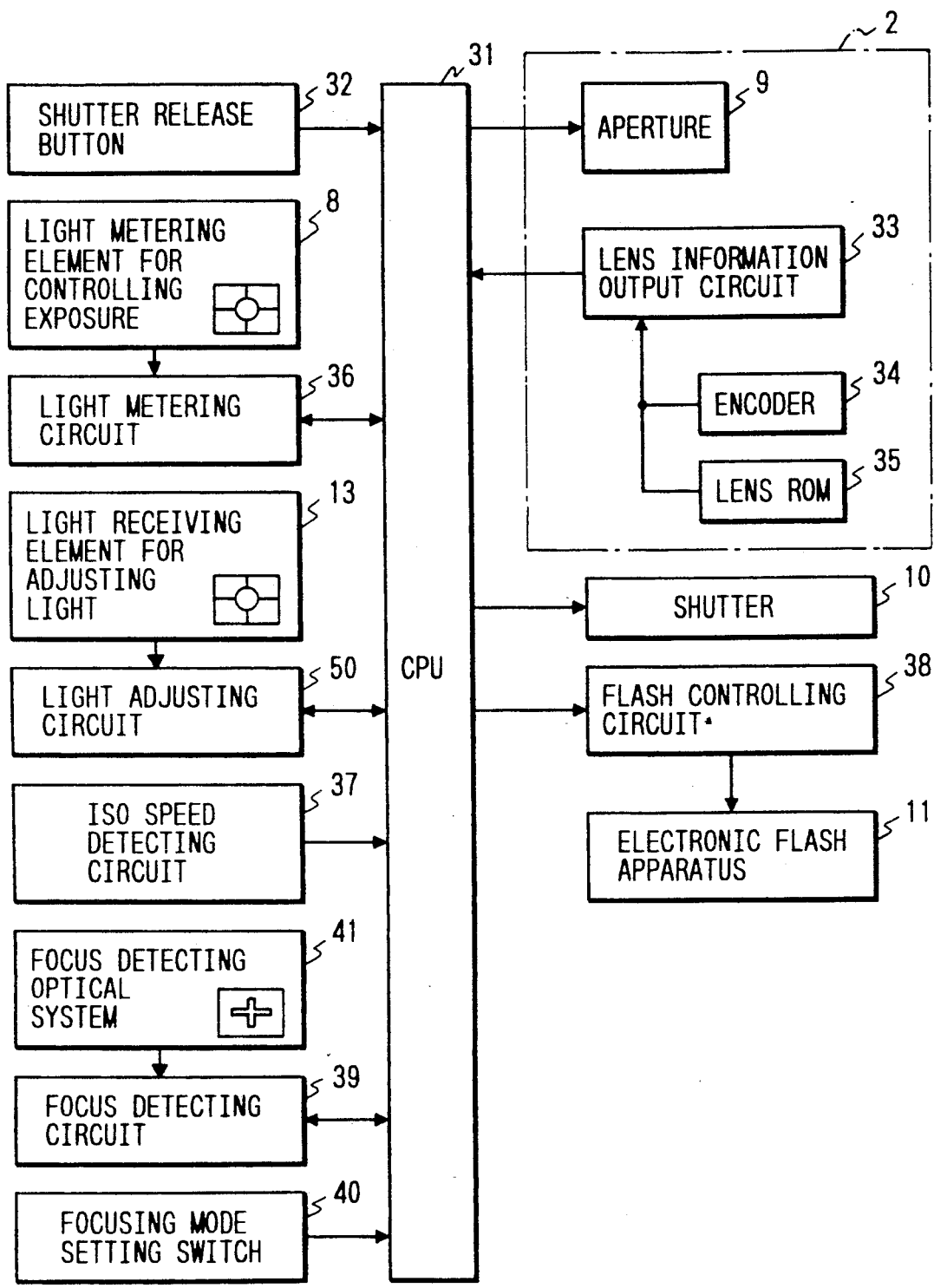
FIG. 4 is a block diagram to show an example of structure of an automatic light adjusting device of a camera according to the present invention.

FIG. 4 is a block diagram to show a structure of an embodiment.

CPU 31 is composed of a microcomputer and neighboring parts thereof to control a sequence of camera operations and to execute a control program as later-described for a light metered value correction control upon the preliminary flash and for a light adjustment control of the electronic flash apparatus 11. Connected to the CPU 31 are the shutter release button 32, the shutter 10, the aperture 9 in the photographic lens 2, and a lens information output circuit 33. The lens information output circuit 33 provides the camera body 1 with information such as a film-to-subject distance X obtainable from an encoder 34 in the lens, an F value at opening aperture stored in a lens ROM 35, an exit pupil distance PO, a film-to-subject distance error ΔX due to the resolution of encoder 34, and so on.

Also connected to the CPU 31 are a light metering circuit 36 for conducting the light metering based on a light metering signal from the exposure control light metering element 8, a light adjusting circuit 50 for conducting the light adjustment based on an output from the light receiving element segments 13a–13e of the light receiving element for light adjustment 13, an ISO speed detecting circuit 37 for reading out an ISO speed of mounted film FI from a DX code, and a flash controlling circuit 38 of the electronic flash apparatus 11. The light metering element for exposure control 8 is also comprised of five light metering element segments 8a–8e corresponding to respective light metering areas of photographic field, similarly as the light receiving element for light adjustment 13.

Further, a focus detecting circuit 39 and a focusing mode setting switch 40 are connected to the CPU 31. The focus detecting circuit 39 detects a focus deviation $\Delta AF$ of photographic lens 2 based on a distance measurement information around the central portion of photographic screen supplied from a focus detecting optical system 41, to output it to the CPU 31. The focusing mode setting switch 40 is a switch for changing an operation mode of an unrepresented autofocusing device (automatic focus adjusting device). There are the following three modes: Single AF servo mode hereinafter called S-AF mode, in which the shutter 10 is automatically released when the photographic lens 2 is focused on a subject; continuous AF servo mode hereinafter called C-AF mode, in which the photographic lens 2 is driven to track a moving subject; and manual focus mode hereinafter called M mode, in which the focusing of photographic lens 2 is manually conducted.

Figure 5:
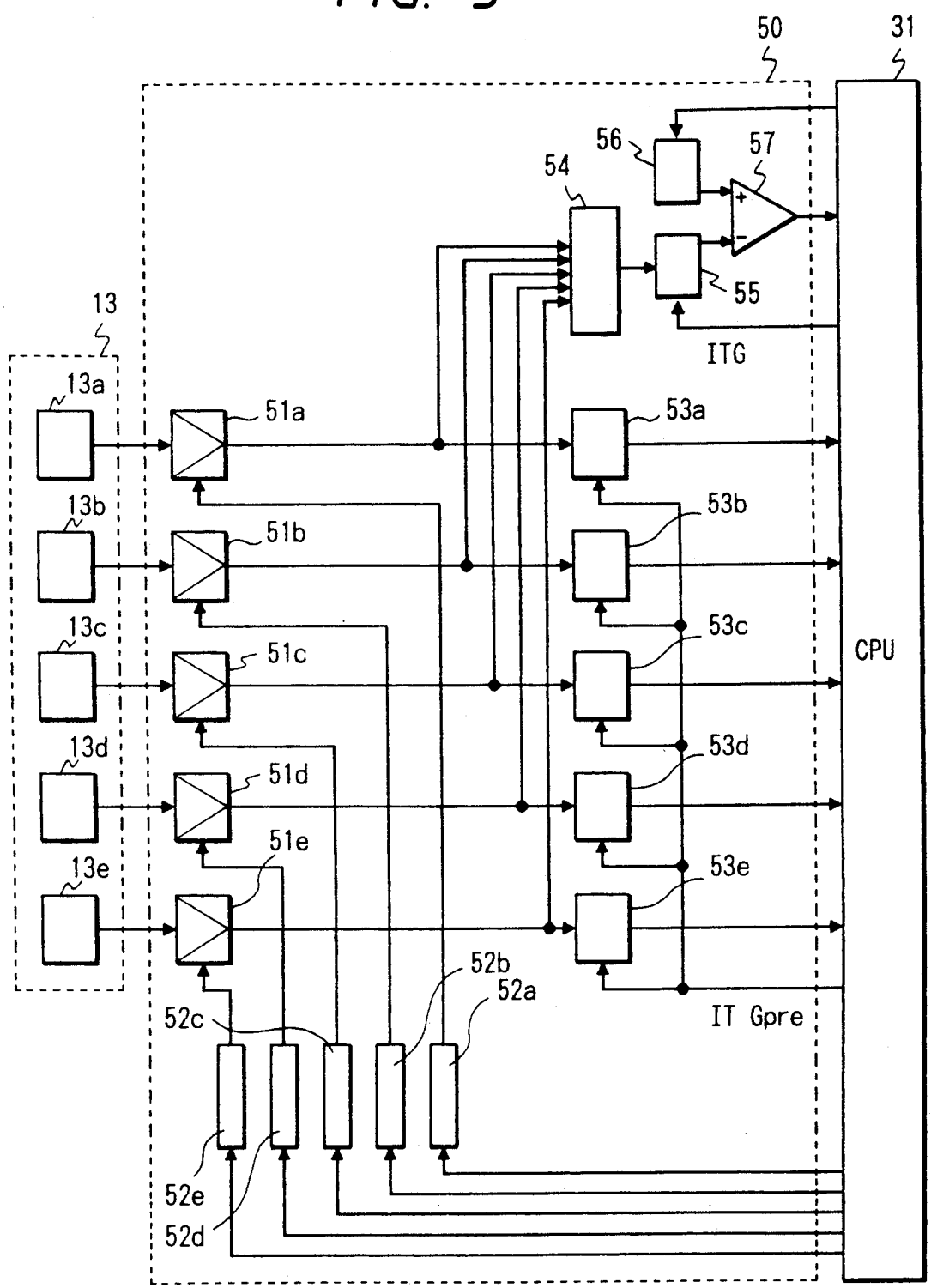
FIG. 5 is a block diagram to show a detail of a light adjusting circuit.

FIG. 5 is a block diagram to show details of the light adjusting circuit 50.

The light adjusting circuit 50 has amplifiers 51a–51e, gain setters 52a–52e, integrating circuits 53a–53e, an adder 54, an integrating circuit 55, a converting circuit 56, and a comparator 57. The amplifiers 51a–51e amplify the respective light metering signals from the light receiving element segments 13a–13e. The gain setters 52a–52e set amplification factors from the CPU 31 into the amplifiers 51a–51e after converting them into analog signals. The integrating circuits 53a–53e integrate with time respective outputs of amplifiers 51a–51e upon the preliminary flash in response to a command from the CPU 31. The adder 54 adds the outputs of amplifiers 51a–51e upon the main flash. The integrating circuit 55 integrates with time the addition result of the adder 54 in response to a command from the CPU 31. The converting circuit 56 converts into an analog signal a later-described light adjusting level preliminarily stored in the CPU 31. The comparator 57 compares the output of the integrating circuit 55 with the converted light adjusting level to output a flash stop signal when the output of the integrating circuit 55 reaches the light adjusting level.

In the above arrangement of the embodiment, the light receiving element for light adjustment 13 constitutes the light metering means, the CPU 31 the light metered value correcting means, the CPU 31 and the light adjusting circuit 50 the light adjusting means, and the electronic flash apparatus 11 the flash apparatus.

The light adjusting operation of the CPU 31 is explained in the following with reference to flowcharts of FIGS. 6–20.

Figure 6:
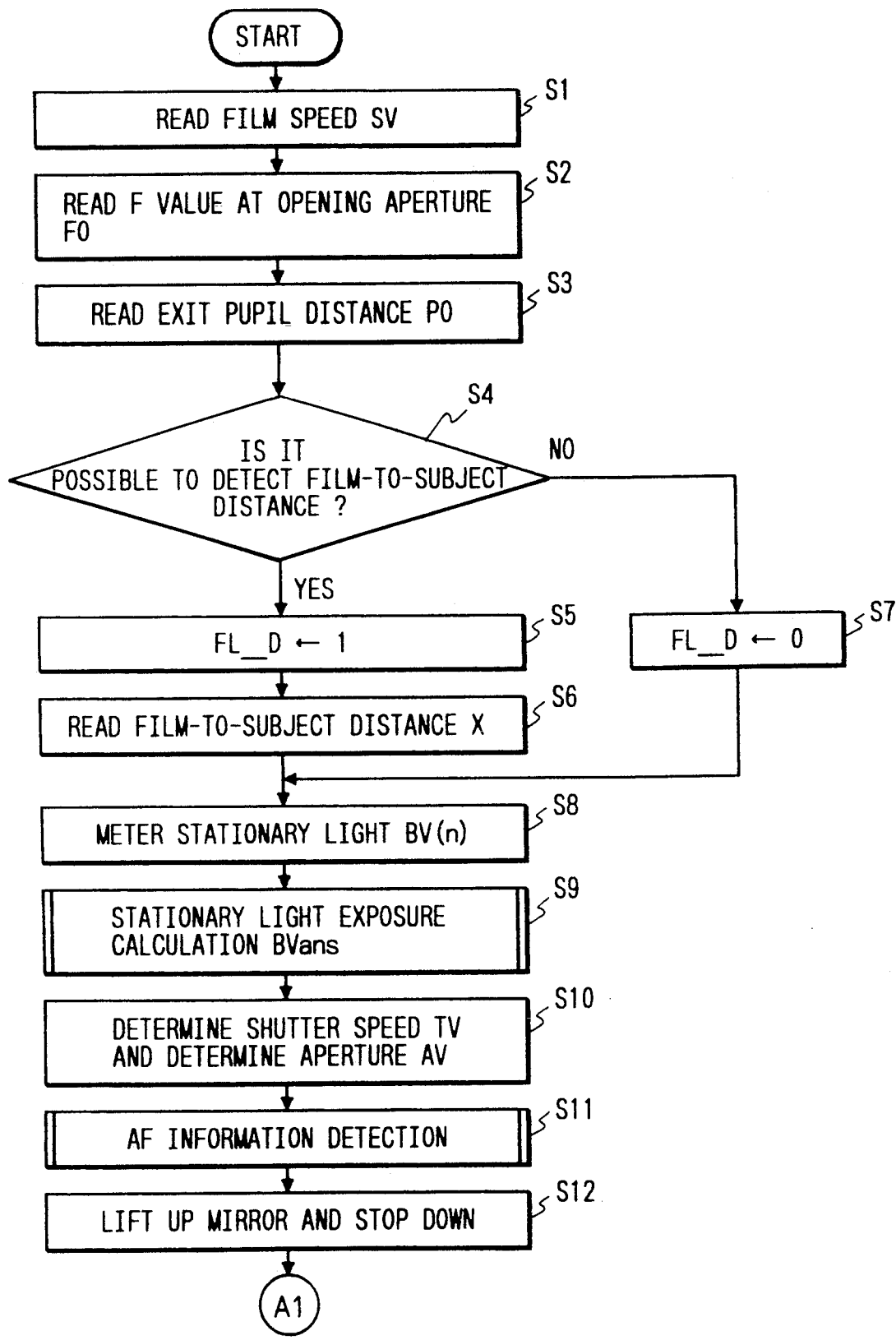
FIG. 6 is a flowchart to show an example of a light adjusting control main program.
Figure 7:
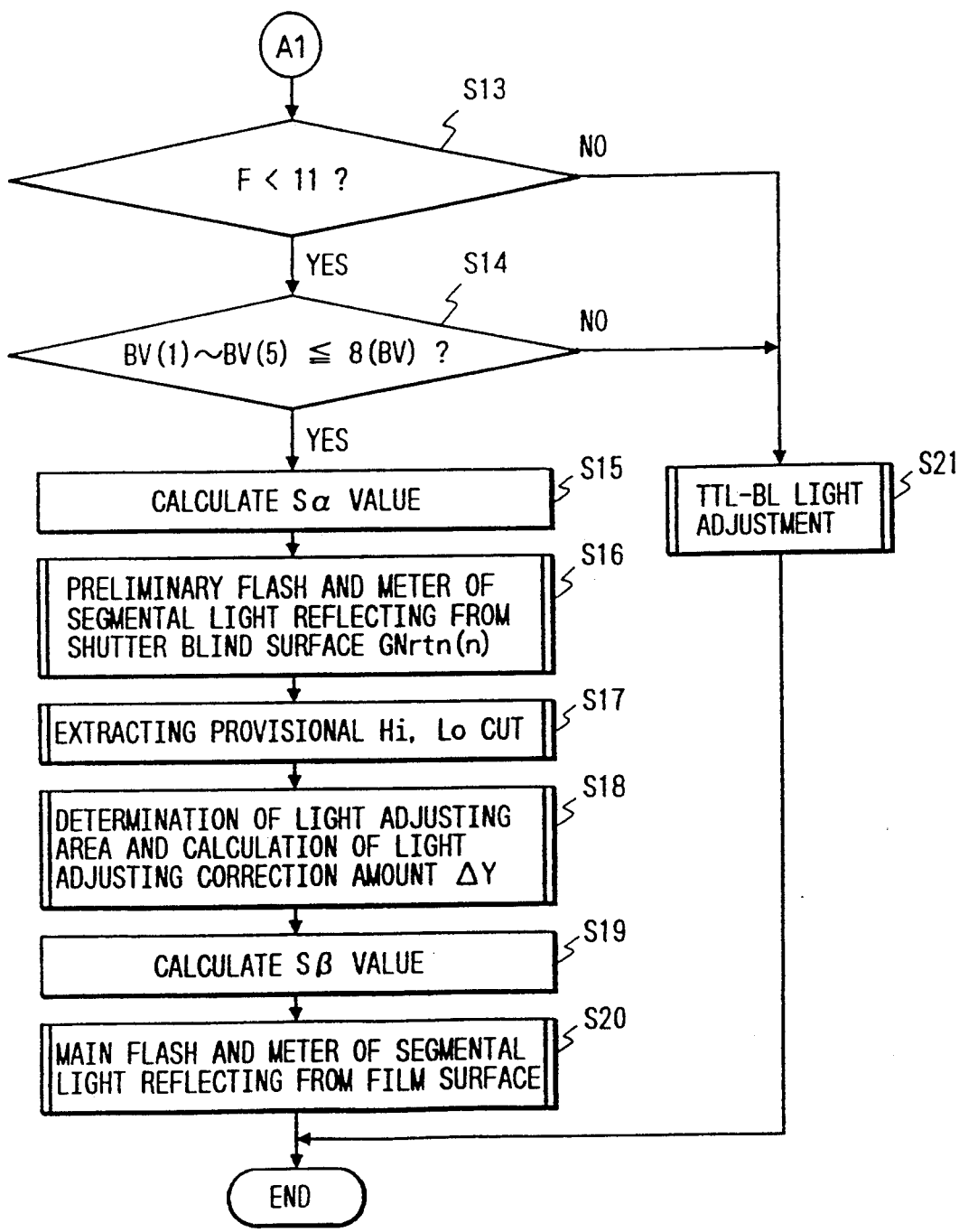
FIG. 7 is a flowchart to show an example of a light adjusting control main program.

FIGS. 6 and 7 show a flowchart for a main control program. The CPU 31 starts executing this program when the shutter release button 32 is fully pressed.

The ISO speed SV of mounted film FI is read out of the ISO detecting circuit 37 at Step S1. Also read out of the lens information output circuit 33 of the photographic lens 2 are the F value at open aperture FO at Step S2 and the exit pupil distance PO at Step S3.

It is judged at Step S4 whether the film-to-subject distance X is detectable. For example, if the photographic lens 2 has an internal encoder 34 for detecting a film-to-subject distance, the distance X is detectable, and a flag FL_D is set at Step S5. In contrast, if the photographic lens 2 does not include an internal encoder 34, the distance X is not detectable, and a flag FL_D is reset at Step S7. The film-to-subject distance X is, for example, a value detected by the encoder, which represents a position of lens driven by the automatic focusing device upon the half-press of shutter release button 32. The film-to-subject distance X is read at Step S6 and a stationary light is metered excluding the reflection light of flash apparatus 2 at Step S8. In more detail, the light metering circuit 36 takes in the outputs of the above-described light metering element segments 8a–8e to effect logarithmic compression thereon. After the logarithmic compression by the light metering circuit 36, luminance values BV (n), where n = 1–5, for the respective light metering areas are read. The value of n, i.e., 1–5, corresponds to each of the five light metering element segments 8a–8e or the light receiving element segments 13a–13e. A stationary light exposure BVans is calculated at Step S9 from the read luminance values BV (n) and ISO speed SV. The calculation may be carried out by using a method as disclosed in FIG. 7 of Japanese Patent Application Laid-open No. 1-285925 of present applicant. A shutter speed TV and an aperture value AV are determined at Step S10 by a known program chart from the thus calculated stationary light exposure BVans, to proceed to the next Step S11. Information about focusing or focusing mode, and a state of focusing are detected at Step S11. The focusing mode is the C-AF mode of automatic focusing, the S-AF mode, or the M mode of manual focusing. The state of focusing means a value of focus deviation as described later.

Then at Step S12, the mirror 3 is lifted up and the aperture 9 is stopped down up to the aperture value AV determined at the above Step. It is judged at Steps S13 and S14 whether the preliminary flash should be conducted. First, it is judged at Step S13 whether the aperture value AV determined at the above Step is smaller than a predetermined value, for example F value of 11 in this embodiment. If it is smaller than the predetermined value, Step S14 is performed. If it is not less than the predetermined value, which is a dark aperture, Step S21 is performed because it is probable that a small light amount of preliminary flash cannot be detected. It is judged at Step S14 whether the luminance values BV (1)–(5) of stationary light detected at the above step are not more than a predetermined value, for example 8 BV in this embodiment. If the luminance values are not more than the predetermined value, Step S15 is performed, while if the luminance values are more than the predetermined value, or, if the stationary light is sufficiently bright, Step S21 is performed because the preliminary flash could be obscured by the stationary light. There is no preliminary flash prosecuted at Step S21, but TTL-BL light adjustment is prosecuted to conclude the execution of program. The TTL-BL light adjustment is described in U.S. Pat. No. 4,809,030 of the present Applicant. Therefore, details thereof are omitted. The TTL-BL light adjustment is conducted based on the addition of light metered values BV (1)–BV (5) in this embodiment.

The light receiving condition is different among the light receiving element segments 13a–13e depending on the exit pupil distance PO of photographic lens 2. In order to evaluate all the photometric outputs of light receiving element segments in the same condition, correction factors $S\alpha$ (n) are calculated by the following equation for the respective light metering areas of photographic lens 2 when the light reflected at the shutter blind surface is metered.

$$Sa(1) = 1$$
$$Sa(2) = 1 - (1.2 \times 10^{-3}) \cdot PO$$
$$Sa(3) = 1 - (1.2 \times 10^{-3}) \cdot PO$$
$$Sa(4) = 1 + (1.7 \times 10^{-3}) \cdot PO$$
$$Sa(5) = 1 + (1.7 \times 10^{-3}) \cdot PO \quad (1)$$

The preliminary flash is carried out at Step S16 to perform the segmental photometry of reflection light from the shutter blind surface. A provisional cut area or light adjustment excluded area is extracted at Step S17 based on the photometry result. The light adjusting area(s) and the light adjusting correction amount $\Delta Y$ are determined at Step S18. The processes of these Steps S16–S18 will be later-detailed with reference to FIGS. 9–18. Correction factors $S\beta$ (n) are calculated at Step S19 for the respective photometric areas of photographic lens 2 upon the light metering of reflection light from the film plane. It is supposed in this embodiment that $S\beta$ (n)=$Sa$ (n). At Step S20, the shutter 10 is fully open to execute the main flash, and the light adjustment is performed by segmental photometry of reflection light from the film plane. This process is later-described with reference to FIGS. 19 and 20.

Figure 8:
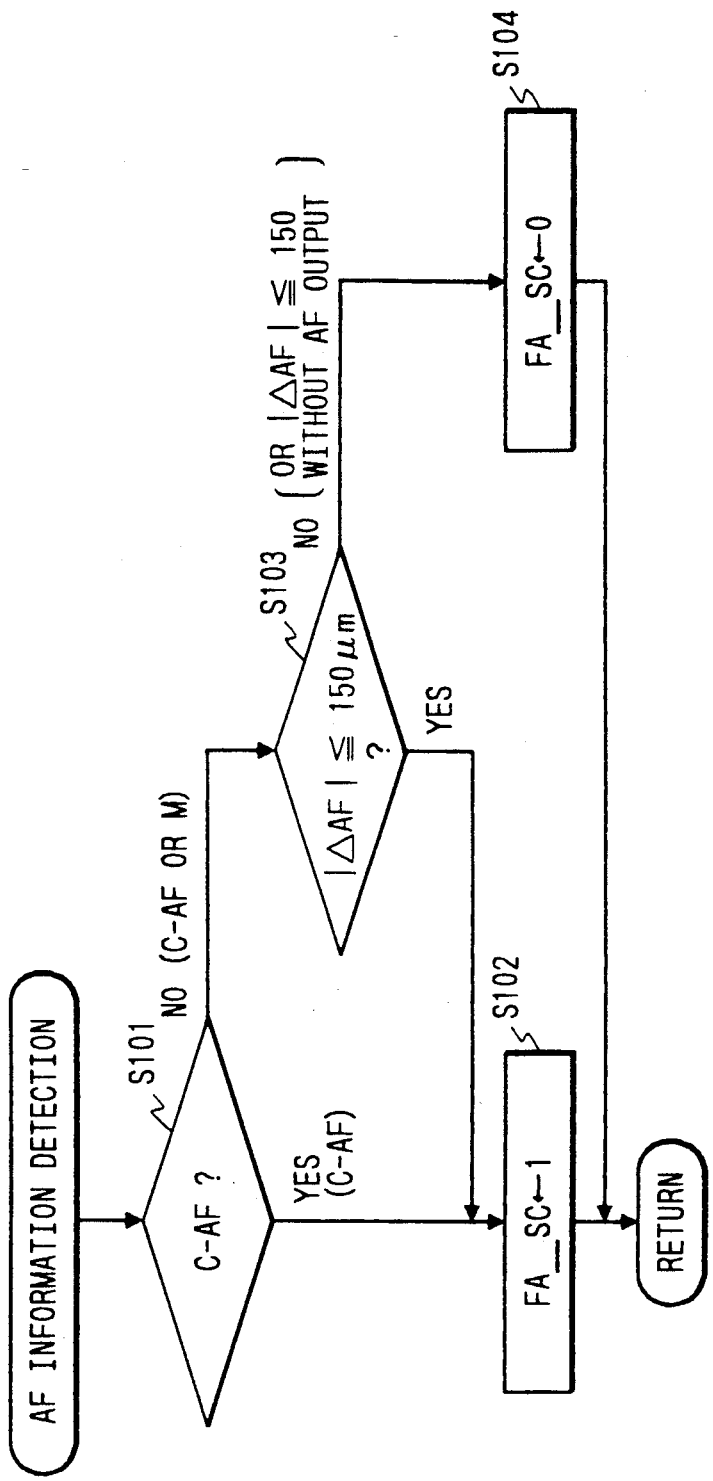
FIG. 8 is a flowchart to show an AF information detection routine.

FIG. 8 is a flowchart to show an AF information detection process at Step S11 of FIG. 6.

The judgement of focusing mode is conducted at Step S101. If the focusing mode setting switch 40 is set in the C-AF mode, it is judged that a main subject is within the focus detection area of photographic screen and a flag FA_SC is set at Step S102. If the S-AF mode or the M mode is set, Step S103 is performed because it cannot be judged whether a main subject is within the focus detection area. It is judged at Step S103 whether an absolute value $|\Delta AF|$ of focus deviation $\Delta AF$ immediately before photographing is not more than 150 $\mu$m. If the absolute value $|\Delta AF|$ is not more than 150 $\mu$m, Step S102 is performed under an assumption that the main subject is within the focus detection area of photographic screen. While, if the absolute value $|\Delta AF|$ is more than 150 $\mu$m, Step S104 is performed as an undistinguishable case about whether the main subject is within the focus detection area, and the flag FA_SC is reset. Then the routine returns to the main program.

Figure 9:
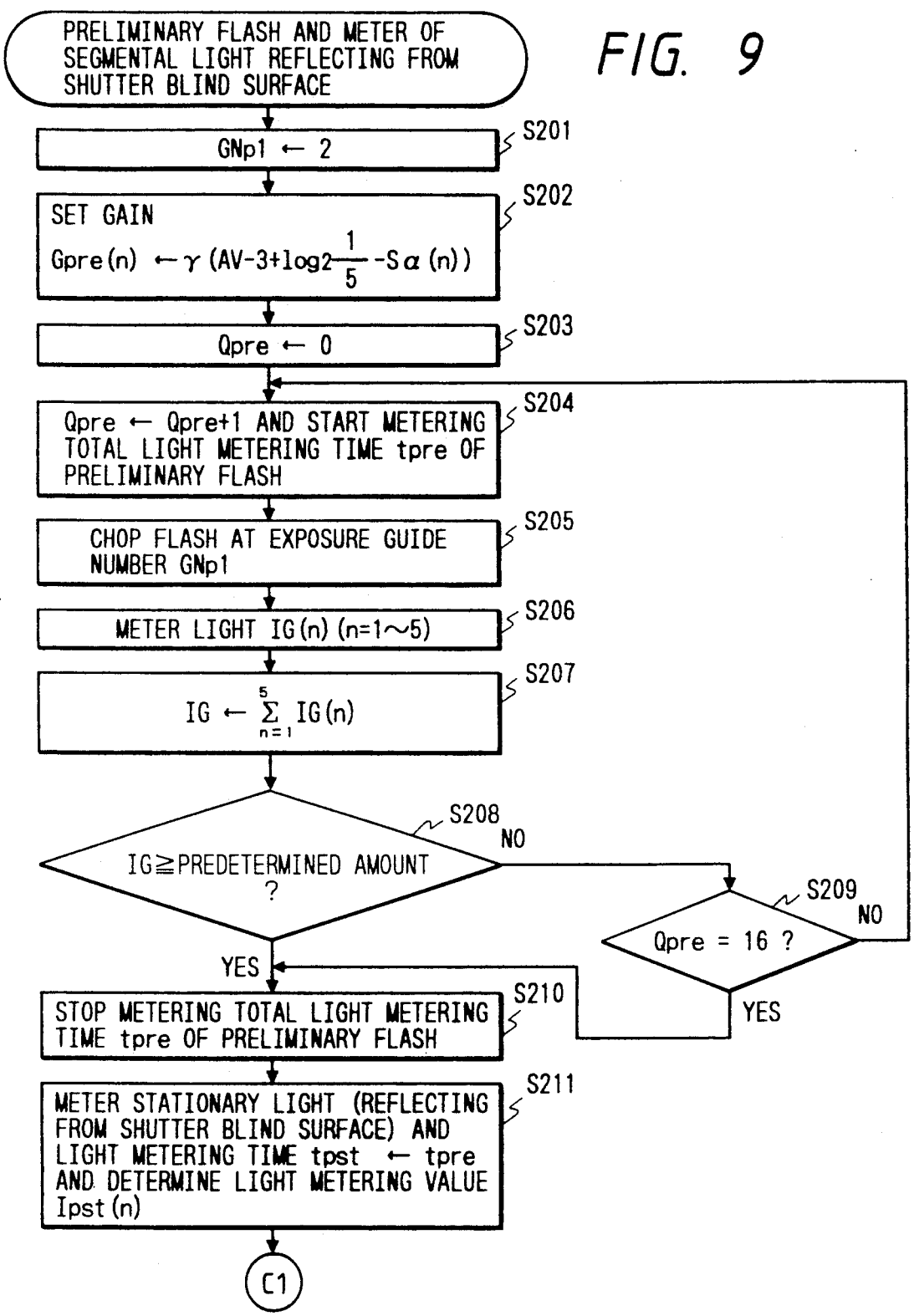
FIG. 9 is a flowchart to show a light metering process routine upon a preliminary flash.
Figure 10:
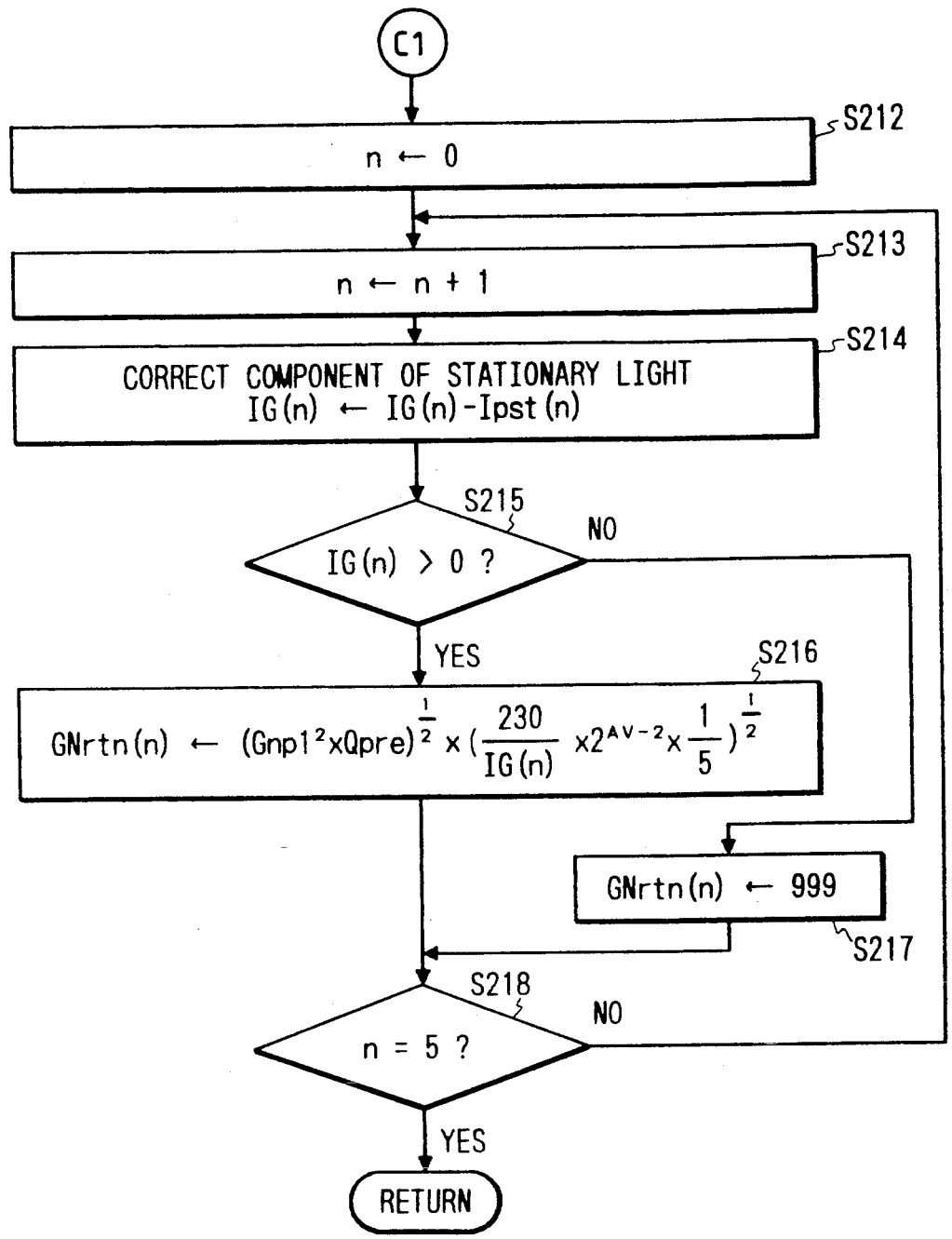
FIG. 10 is a flowchart to show the light metering process routine upon the preliminary flash.

FIGS. 9 and 10 are flowcharts to show the preliminary flash process at Step S16 of FIG. 7.

A guide number GNp1 per preliminary flash is set to 2 at Step S201. There are a plurality of chop flashes with a guide number of 2 upon the preliminary flash in this embodiment. At Step S202, gains Gpre (n) are calculated by the following equation for the gain setters 52a–52e of light adjusting circuit 50.

$$Gpre(n) = \gamma(AV - 3 + \log_2(1/5) - Sa(n)) \quad (2)$$

The number Qpre of chop flashes is reset at Step S203. At Step S204, the number Qpre gains an increment, and a timer is started to measure a total light metering time upon the preliminary flash.

A chop flash is performed at Step S205 per guide number GNp1 (GNp1=2). The light metering of chop flash is carried out at Step S206. In detail, an optical flux of a chop flash is reflected in the photographic field to pass through the photographic lens 2, focusing into a primary image on the blind surface of shutter 10. The primary image is divided into five areas, which are respectively received by the five light receiving element segments 13a–13e via the condenser lens array 12 as shown in FIG. 3. The light receiving element segments 13a–13e sequentially output respective light metering signals corresponding to respective light receiving amounts to the amplifiers 51a–51e of light adjusting circuit 50. The amplifiers 51a–51e amplify the respective light metering signals with the gains Gpre (n) set in the gain setters 52a–52e after calculation at the above Step, and output the amplified signals to the integrating circuits 53a–53e. The CPU 31 outputs operational signals to the integrating circuits 53a–53e, and then the integrating circuits 53a–53e integrate with time the respective integrated light metering signals in response to the operational signals to output integration values IG (n), where n=1–5.

A summation of integration values IG (n) of five light metering signals is calculated at Step S207. It is judged at Step S208 whether the summation IG of light metering signals is not less than a predetermined value, for example, 230 in this embodiment. If the summation is not less than the predetermined value, Step S210 is carried out. If the summation is less than the predetermined value, Step S209 is carried out. It is judged at Step S209 whether the number Qpre of chop flashes is 16 or not. If the number Qpre is 16, Step S210 is performed. If the number Qpre is not 16, the flow returns to Step S204 to repeat the above processes. At Step S210, the timer for measuring the total light metering time tpre required for photometry upon the preliminary flash is stopped to detect the total light metering time tpre. At Step S211, the light metering of stationary light is carried out by the same optical system as in the light metering of preliminary flash to detect light metering values Ipst (n). The light metering time tpst is set to be equal to the total light metering time tpre required for the light metering of preliminary flash.

At next Steps S212–218, a correction is effected to eliminate the stationary light component from the five light metering signals of areas of n=1–5, and the guide number GNrtn upon the preliminary flash is calculated. The area number n is first reset at Step S212, and the area number n is given an increment at Step S213. At Step S214, a correction is effected by subtracting the stationary light component Ipst (n) from the integration value IG (n) of light metering signal having the preliminary flash component of flash apparatus 11 and the stationary light component. It is then judged at Step S215 whether the integration value IG (n) of light metering signal after the correction is positive. If it is positive, Step S216 is performed. If not, Step S217 is performed. The guide number GNrtn (n) upon the preliminary flash is calculated by the following equation at Step S216 to show how much the preliminary flash light returns.

$$GNrtn(n) = (GNp1^2 \times Qpre)^{\frac{1}{2}} \times [\{230/IG(n)\} \times 2^{AV-2} \times (1/5)]^{\frac{1}{2}} \quad (3)$$

In the equation. GNrtn (n) is a value obtained by multiplying the aperture value F by the film-to-subject distance X if a subject of each area has a standard reflectance. In more detail, there is a subject of standard reflectance at a position of film-to-subject distance X in an area of $F \times X = GNrtn$ (n), there exists an object of higher reflectance at a position of film-to-subject distance X in an area of $F \times X > GNrtn(n)$ than the standard reflectance, and there exists an object of lower reflectance at a position of film-to-subject distance X in an area $F \times X < GNrtn(n)$ than the standard reflectance. The higher the reflectance of an object, the smaller GNrtn (n). If the integration value IG (n) of light metering signal is not positive after the correction of elimination of the stationary light component, a very large value, for example, 999, regarded as infinity is set as GNrtn (n) at Step S217 to proceed to Step S218. In other words, the light metering value of preliminary flash is set as 0 or a positive minimal number. It is judged at Step S218 whether the above processes are concluded for all n areas. If concluded, the flow returns to the main program. If not, the flow returns to Step S213.

Figure 11:
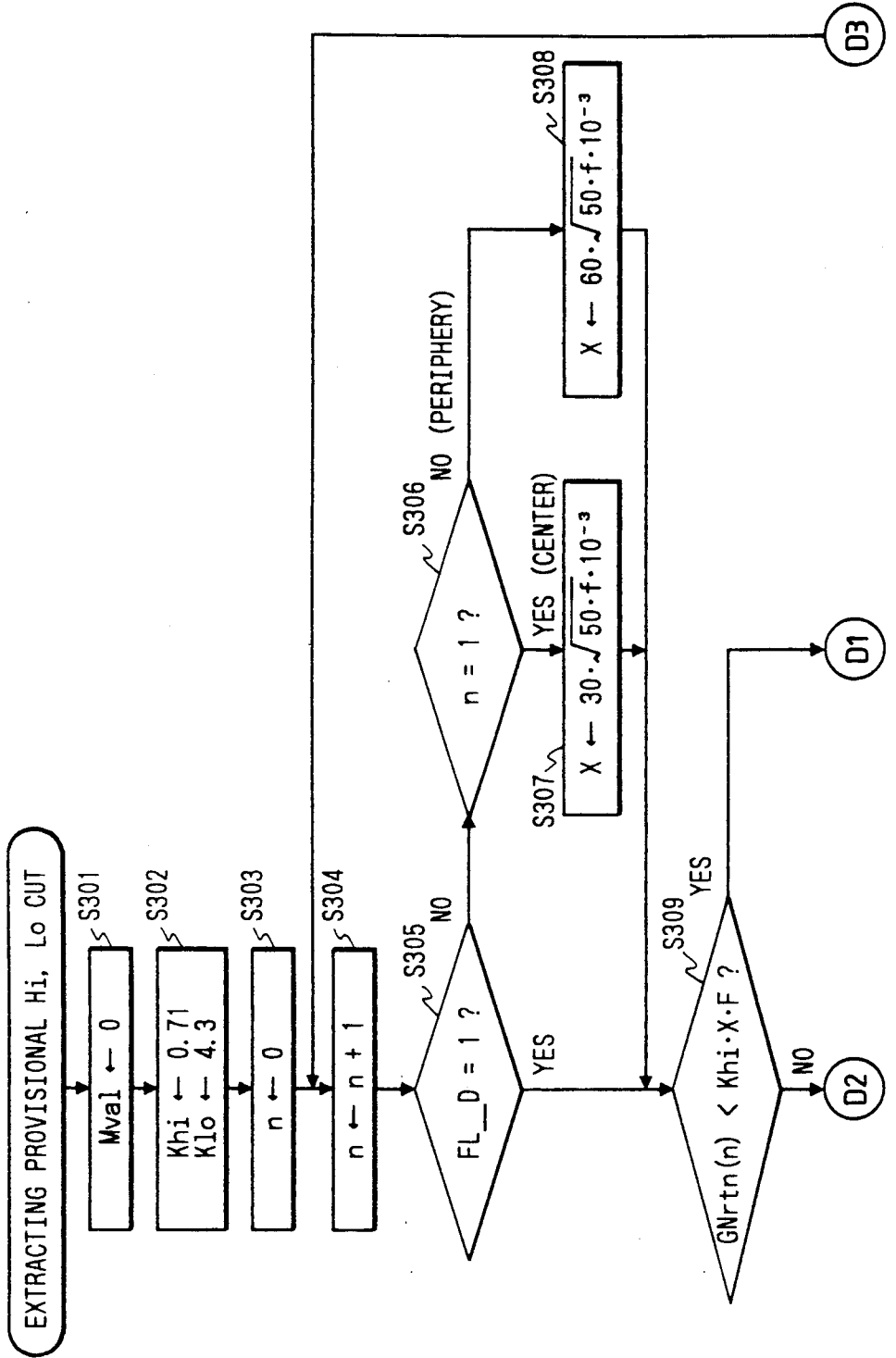
FIG. 11 is a flowchart to show a provisional Hi, Lo cut area extracting routine.
Figure 12:
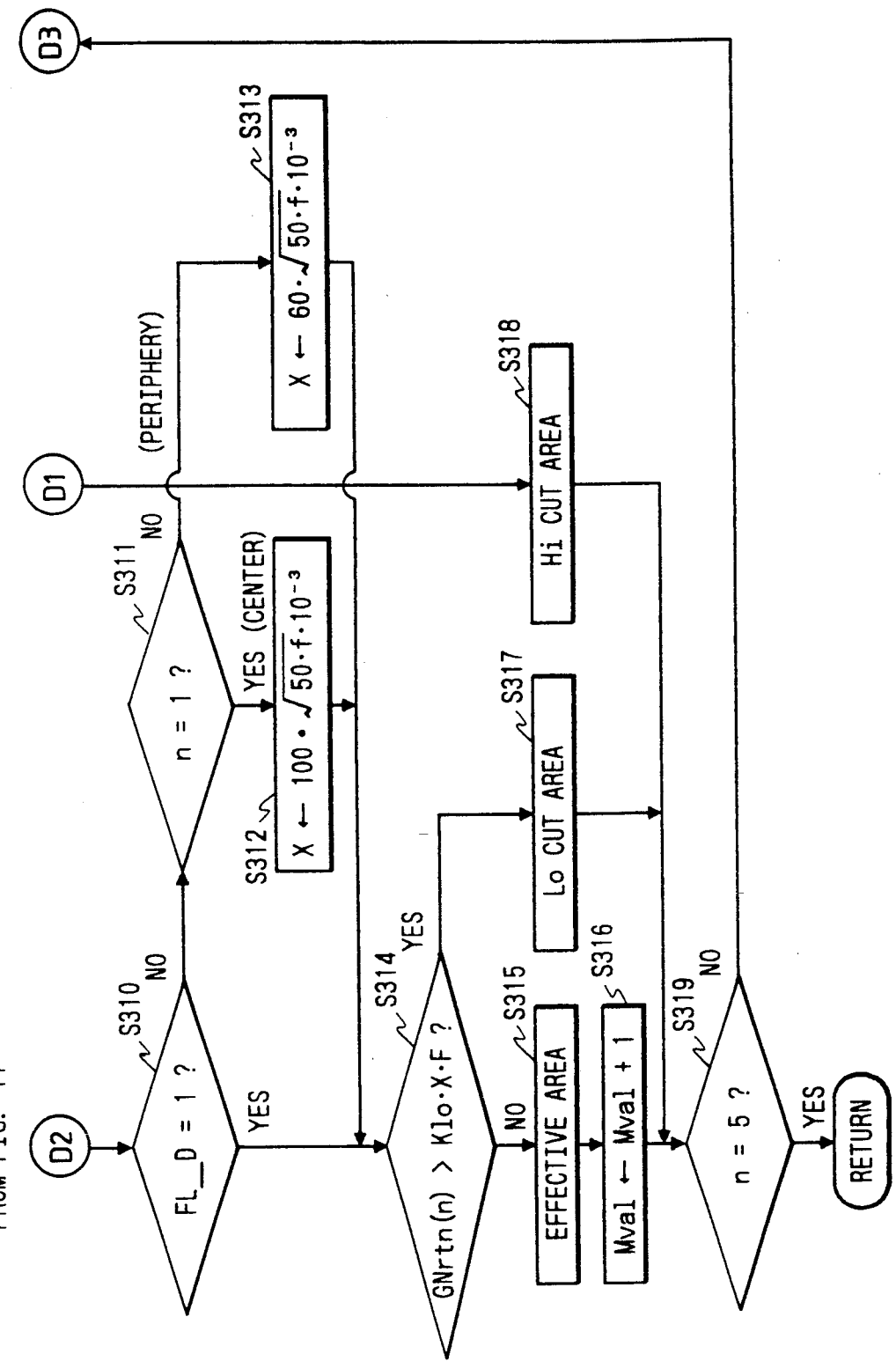
FIG. 12 is a flowchart to show the provisional Hi, Lo cut area extracting routine.

FIGS. 11 and 12 are flowcharts to show the provisional Hi, Lo cut extracting process at Step S17 of FIG. 7.

Effective area Mval for a light adjusting area is reset at Step S301. Set at Step S302 are 0.71 for judgement coefficient Khi of Hi cut area and 4.3 for judgement coefficient Klo of Lo cut area. The area number n is reset at Step S303, and then the area number n is given an increment at Step S304. It is judged at Step S305 whether the flag FL_D is 1, or whether the film-to-subject distance X is detected. If the film-to-subject distance X is detected, Step S309 is processed. If not, Step S306 is processed. It is judged at Step S306 whether the area number n is 1. Area 1 is the central area of photographic screen in this embodiment. If the judgement is the screen center area of Area 1, Step S307 is processed. If not, Step S308 is processed. Set at Step S307 is a value determined by the following equation as the film-to-subject distance X in unit of m.

$$X = 30 \times (50 \cdot f)^{1/2} \times 10^{-3} \quad (4)$$

In the above equation, f is a focus distance of photographic lens 2 in unit of mm. For example, when f = 50 mm, X = 1.5 m.

Whilst, if the judgement is not the screen center area, a value determined by the following equation is set at Step S308 as the film-to-subject distance X.

$$X = 60 \times (50 \cdot f)^{\frac{1}{2}} \times 10^{-3} \quad (5)$$

It is judged at Step S309 whether the guide number GNrtn (n) calculated at the above Step is smaller than $Khi \times X \times F$. If smaller, the flow goes to Step S318 of FIG. 12, while if not, to Step S310. At Step S318 of FIG. 12, the area is regarded as the provisional Hi cut area where there exists an object of high reflectance such as a golden screen or mirror, or where there exists a subject, which is not a main subject, closer to the camera than the film-to-subject distance X. Even if the film-to-subject distance X is not detected and if the value of guide number GNrtn is clearly extremely small, the judgement of Step S309 is conducted using the film-to-subject distance X set at Step S307 or Step S308 to regard the area as the provisional Hi cut area when the guide number GNrtn (n) is smaller than $Khi \times X \times F$, judging it as a high reflection object. Comparing the film-to-subject distance X of Step S307 with that of Step S308, the film-to-subject distance X of Step S307 is set to be smaller than that of Step S308. This is because it is made more difficult to judge the center as the provisional Hi cut area than the periphery to prevent the main subject from being cut at the center, since it is highly probable that the main subject is located at the center.

It is again judged at Step S310 of FIG. 12 whether the flag FL_D is 1. If affirmative, Step S314 is processed, while if negative, Step S310 is processed. It is judged at Step S311 whether the area number n is 1. If n = 1, or if the area is the center, a value determined by the following equation is set as the film-to-subject distance X at Step S312.

$$X = 100 \times (50 \times f)^{\frac{1}{2}} \times 10^{-3} \quad (6)$$

Whilst, if the area is not the center, a value determined by the following equation is set as the film-to-subject distance X at Step S313.

$$X = 60 \times (50 \times f)^{\frac{1}{2}} \times 10^{-3} \quad (7)$$

It is judged at Step S314 whether the guide number GNrtn (n) calculated at the above Step is larger than $Klo \times X \times F$. If larger, Step S317 is processed, while if not, Step S315 is processed. The area is judged at Step S317 as the provisional Lo cut area under a judgement that there exists a low reflectance object in the area, for example, in case of missing background. The above provisional Hi cut area and Lo cut area are provisional light adjustment excluded areas. Even if the film-to-subject distance X is not detected, and if the guide number GNrtn is clearly extremely large, the judgement of Step S314 is conducted using the film-to-subject distance X set at Step S312 or Step S313 to regard the area as the provisional Lo cut area, judging a low reflectance object when the guide number GNrtn (n) is larger than $Klo \times X \times F$. Comparing the film-to-subject distance X of Step S312 with that of Step S313, the film-to-subject distance X of Step S312 is set to be larger than that of Step S313. This is as described above because it is made more difficult to judge the center as the provisional Lo cut area than the periphery to prevent the main subject from being cut in the center, since there is a high probability that the main subject is located at the center.

If both Step S309 and S314 are negated, the area is regarded as a provisional effective area or a provisional light adjustment intended area at Step S315. The number of effective areas Mval is given an increment at Step S316, and then the flow goes to Step S319. It is judged at Step S319 whether the area number n is 5, or whether the above processes are completed for all the areas. If completed, the flow returns to the main program. If not, the flow returns to Step S304 of FIG. 11.

According to the processes for extracting the provisional Hi, Lo cut areas of FIGS. 11 and 12, the area is regarded as the provisional Hi cut area if the following (8) is satisfied by the guide number GNrtn (n) calculated based on the light metering signal of each area upon the preliminary flash.

$$GNrtn(n) < Khi \times X \times F \quad (8),$$

the area is regarded as the provisional Lo cut area if the following (9) is satisfied, $$GNrtn(n) > Klo \times X \times F \quad (9),$$

and the area is regarded as the provisional effective area if the following (10) is satisfied.

$$Khi \times X \times F \leq GNrtn(n) \leq Klo \times X \times F \qquad (10).$$

In other words the area becomes the provisional light adjustment intended area when the light metering signal upon the preliminary flash is within the determined range, while the area becomes the provisional light adjustment excluded area when the light metering signal is out of the range.

FIGS. 13-18 are flowcharts to show the processes for determination of light adjustment area and for calculation of light adjusting correction amount at Step S18 of FIG. 7. The processes determine a final light adjustment intended area and calculate the light adjustment correction amount $\Delta Y$. The light adjusting correction amount $\Delta Y$ is used when the gains are obtained for the gain setters 52a-52b of light adjusting circuit 50 upon the main flash. When $\Delta Y > 0$, the light amount of flash increases by delaying the flash stop time of main flash as the correction amount increases. Conversely, when $\Delta Y < 0$, the light amount of flash decreases by advancing the flash stop time of main flash as the absolute value $|\Delta Y|$ increases.

It is judged at Step S401 whether the flag FA_SC is 1. If the flag is 1, the flow goes to Step S402, while if not, the flow goes to Step S406. The central area is finally determined at Step S402 as the light adjusting area. Step S403 follows Step S402 to judge whether all the five areas are provisional effective areas based on the judgement results in the process routines as shown in FIGS. 11 and 12. If all the five areas are the provisional effective areas, the flow goes to Step S431 of FIG. 16, while if not the flow goes to Step S404. If the central area is the provisional Hi cut area at Step S404 from the judgement result in the process routines as shown in FIGS. 11 and 12, the flow goes to Step S430 of FIG. 16. If not, the flow goes to Step S405. If the central area is the provisional Lo cut area at Step S405 from the judgement results of FIGS. 11 and 12, the flow goes to Step S429 of FIG. 16. If not, the flow goes to Step S420 of FIG. 15.

The following is judged at Steps S406-S409 from the process results of process routines as shown in FIGS. 11 and 12: (1) whether all the five areas are the provisional effective areas; (2) whether all the five areas are the provisional Hi cut areas; (3) whether all the five areas are the provisional Lo cut areas; (4) whether all the five areas are the provisional cut areas which are a combination of provisional Hi, Lo cut areas; (5) whether there are mixed the provisional cut areas and the provisional effective areas. The following processes are carried out depending on the judgement result.

It is first judged at Step S406 whether all the five areas are the effective areas. If all the five areas are the provisional effective areas, the flow proceeds to Step S418 of FIG. 14A to set 5 as the number of effective areas Mval. All the five areas are finally determined as the light adjustment intended area at Step S419, and then the flow proceeds to Step S431 of FIG. 16. At Step S431 of FIG. 16, a summation Qgnr of light metering signals of respective areas upon the preliminary flash is calculated by the following equation.

$$Qgnr = \Sigma (1/GNrtn(n))^2 \qquad (11).$$

where $\Sigma$ represents a summation of $n-1-5$.

Further at Step S432, a distribution R (n) of light metering signals of respective areas is calculated by the following equation when the summation of light metering signals of five areas is 1.

$$R(n) = (1/GNrtn(n))^2 / Qgnr \qquad (12),$$

where $n = 1-5$.

The area number n is reset at Step S433, and the area number n is given an increment at Step S434. It is judged at Step S435 whether the distribution R (n) is not less than 1/5. If yes, the flow goes to Step S436, while if no, the flow goes to Step S437. A new exposure amount TR is set by adding 1/5 to the previous exposure amount at Step S436. A new exposure amount TR is calculated by the following equation at Step S437.

$$TR = TR + (1/5) \times R(n)/MAX(R(n)) \qquad (13),$$

where TR on the right side is the previous exposure amount, and MAX (R (n)) is the maximum of R (n).

It is judged at Step S438 whether the area number n is 5, or whether the above calculation is completed for all the areas. If completed, the flow goes to Step S439, while if not, the flow goes to Step S434. The light adjusting correction amount $\Delta Y$ is calculated at Step S439 by the following equation using the exposure amount TR finally calculated.

$$\Delta Y = \log_2(TR/1) \qquad (14)$$

As seen, the light adjusting correction amount $\Delta Y$ is calculated based on the distribution R (n) of light metering signals of respective areas, so that a stop timing of the main flash may be well controlled in the main flash process as described later.

Figure 13:
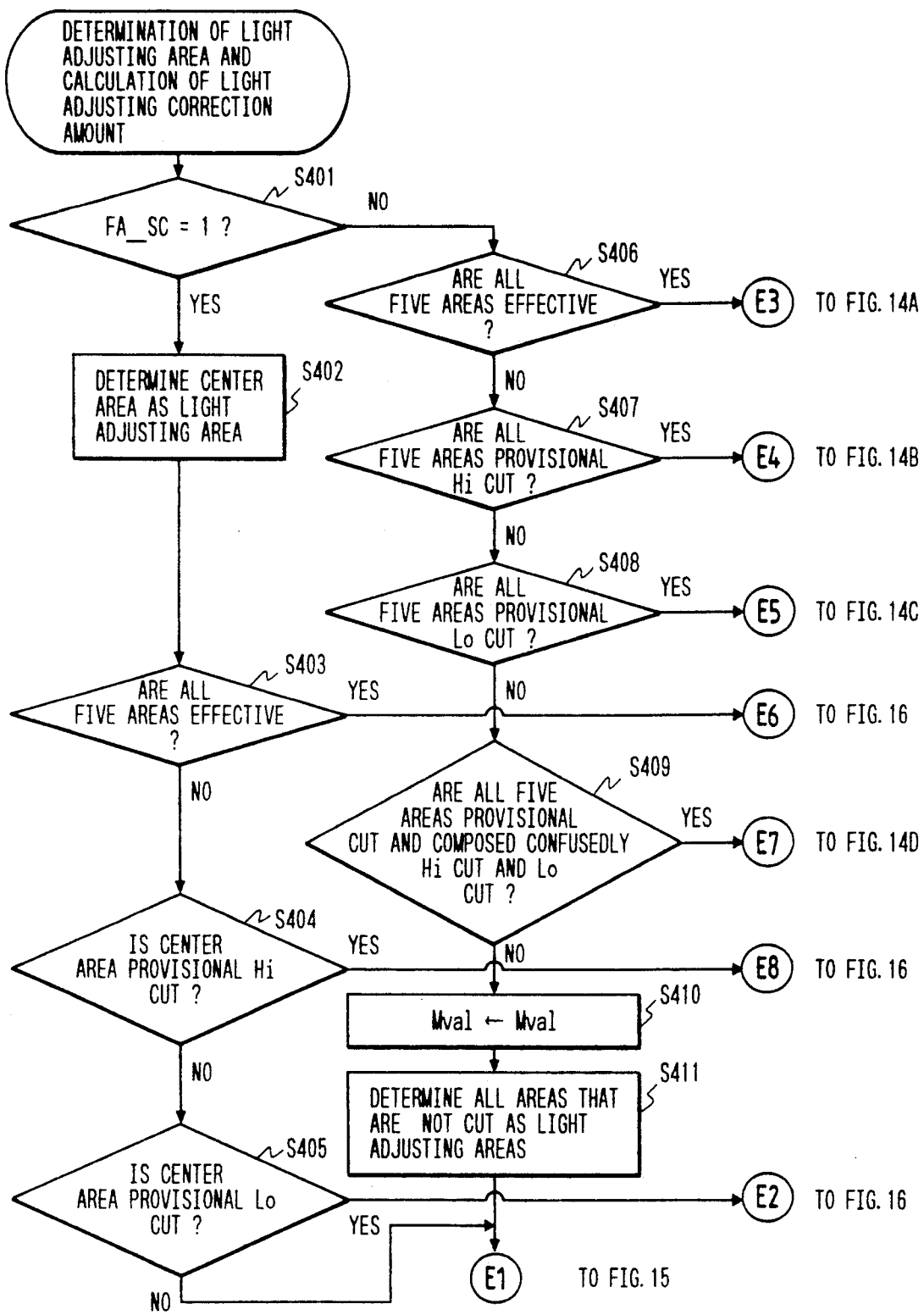
FIG. 13 is a flowchart to show a routine for determination of light adjusting area and for calculation of light adjusting correction amount.
Figure 17:
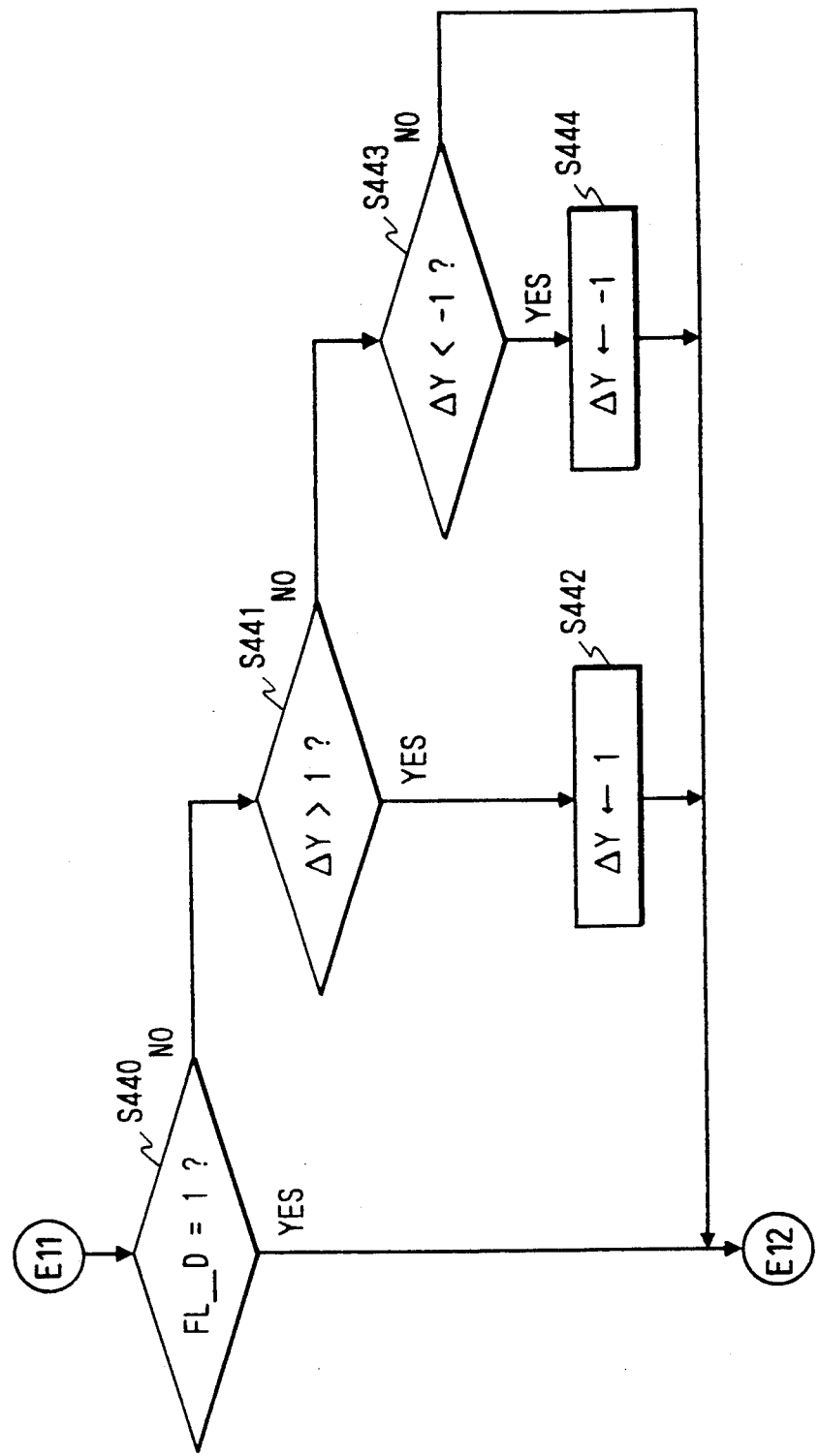
FIG. 17 is a flowchart to show a routine for determination of light adjusting area and for calculation of light adjusting correction amount.

If Step S406 of FIG. 13 is negated, it is judged at Step S407 whether all the five areas are the provisional Hi cut areas. If all the areas are the provisional Hi cut areas, the flow proceeds to Step S416 of FIG. 14B to set 1 as the number of effective areas Mval. The area having the highest guide number GNrtn (n) is finally determined as the light adjustment intended area at Step S417. The highest guide number GNrtn (n) means the minimum light metering signal upon the preliminary flash, or the closest to the aforementioned, determined range (effective area) for judging whether the area is the Hi cut area, where there is the least influence expected from the high reflectance object. If there are plural candidates to be selected as the highest, the area with the smaller area number has a priority. The light adjustment correction amount $\Delta Y$ is set to "+1.5" at Step S430 of FIG. 16. That is, if all the areas are Hi cut areas, the light adjustment stop timing is delayed to prevent an under-exposure.

If Step S407 of FIG. 13 is negated, it is judged at Step S408 whether all the five areas are the provisional Lo cut areas. If all the areas are the provisional Lo cut areas the flow goes to Step S414 of FIG. 14C to set 1 as the number of effective areas Mval. The area with the lowest guide number GNrtn (n) is determined as the light adjustment intended area at Step S415. The lowest guide number GNrtn (n) means the maximum light metering signal upon the preliminary flash, or the closest to the above-mentioned, determined range (effective area) for judging whether the area is the cut area, where there is the least influence expected from no return of reflection light of flash. If there are plural candidates to be selected as the closest, the area with the smallest area number has a priority. The light adjustment correction amount ΔY is set to "−1" at Step S429 of FIG. 16. That is, if all the areas are the provisional Lo cut areas, the light adjustment stop timing is advanced to prevent an over-exposure.

If Step S408 of FIG. 13 is negated, it is judged at Step S409 whether all the areas are the provisional cut areas, and whether there are mixed the provisional Hi cut areas and the provisional Lo cut areas. If affirmed, the flow proceeds to Step S412 of FIG. 14D to set 1 as the number of effective areas Mval. At Step S413, similarly as in the case of five effective areas, the area with the smallest guide number GNrtn (n) is determined as the light adjustment intended area. Further, the light adjusting correction amount ΔY is set to "+1" at Step S428 of FIG. 15. The main subject is considered to reside in the provisional Hi cut areas because there must exist no object in the missing background in the provisional Lo cut areas, and because there must exist a high reflectance object, for example a golden screen or mirror, in the provisional Hi cut areas. Therefore, the correction amount ΔY is set to "+1" to avoid both the influence from the high reflectance object and from the low reflectance object.

If Step S409 of FIG. 13 is negated, the number Mval obtained in the process routines of FIGS. 11 and 12 is set as the number of effective areas Mval at Step S410. The provisional effective areas are finally determined as the light adjustment intended area at Step S411. It is then judged at Step S420 of FIG. 15 whether there is a provisional Hi cut area. If there is even one, the light adjusting correction amount ΔY is set to "+⅓" at Step S422. If there is no Hi cut area, the correction amount ΔY is set to 0 at Step S421, and then Step S423 is performed. It is judged at Step S423 whether there is a provisional Lo cut area. If there is, the flow proceeds to Step S425, while if there is not, the flow proceeds to Step S424. The light adjusting correction amount ΔY is calculated by the following equation at Step S425.

$$\Delta Y = \Delta Y - (\tfrac{1}{3}) \times (Mval - 1) \qquad (15)$$

It is judged at Step S426 whether the calculated light adjusting correction amount ΔY is smaller than −⅔. If yes, the light adjusting correction amount ΔY is set to −⅔ at Step S427, while if no, Step S427 is skipped. If it is judged at Step S423 that there is no provisional Lo cut area, the current light adjusting correction amount ΔY is regarded as the light adjusting correction amount ΔY as it is at Step S421. If there is a provisional Hi cut area, there exists a high reflectance object therein as described above. Even if adjacent areas are not provisional Hi cut areas, they may be affected by the object. Therefore, the correction amount ΔY is set to "+⅓".

In contrast, there is explained in the following a case of presence of a provisional Lo cut area.

Suppose there exists nothing behind the main subject. In this case, the number of effective areas may differ even for the same magnification of the subject between a case in which the subject is present at an edge of screen and a case in which the subject is present near the center of screen. If the subject is present at the edge of screen, there are less areas including the subject decreasing the effective areas, which is not Lo-cut. If the subject is located near the center of screen, more areas include the subject, increasing the number of effective areas. If the magnification of the subject is identical, the more the effective areas or areas including the subject, the smaller an area of the subject occupying each area, decreasing the light metering signal upon the preliminary flash. Accordingly in this embodiment, as shown by the above equation (15), as the number of effective area Mval increases, the amount ΔY is shifted more negative.

It is judged at Step S440 whether the flag FL_D is 1. If 1, the flow proceeds to Step S445 of FIG. 18, while if not, which is corresponding to the case where the film-to-subject distance X cannot be detected, the flow proceeds to Step S441. It is dangerous to set a large value as the light adjusting correction amount ΔY when the film-to-subject distance X is not detected. Then limits are set to define a range between −1 and +1 for the calculated light adjusting correction amount ΔY at Steps S441-S444. It is first judged at Step S441 whether the light adjusting correction amount ΔY is larger than 1. If it is larger than 1, the flow proceeds to Step S442 to set 1 as the light adjusting correction amount ΔY, while if it is not more than 1, the flow proceeds to Step S443. It is judged at Step S443 whether the light adjusting correction amount ΔY is smaller than −1. If it is smaller than −1, the flow proceeds to Step S444 to set −1 as the light adjusting correction amount ΔY. If it is not less than −1, the flow proceeds to Step S445 of FIG. 18.

Figure 18:
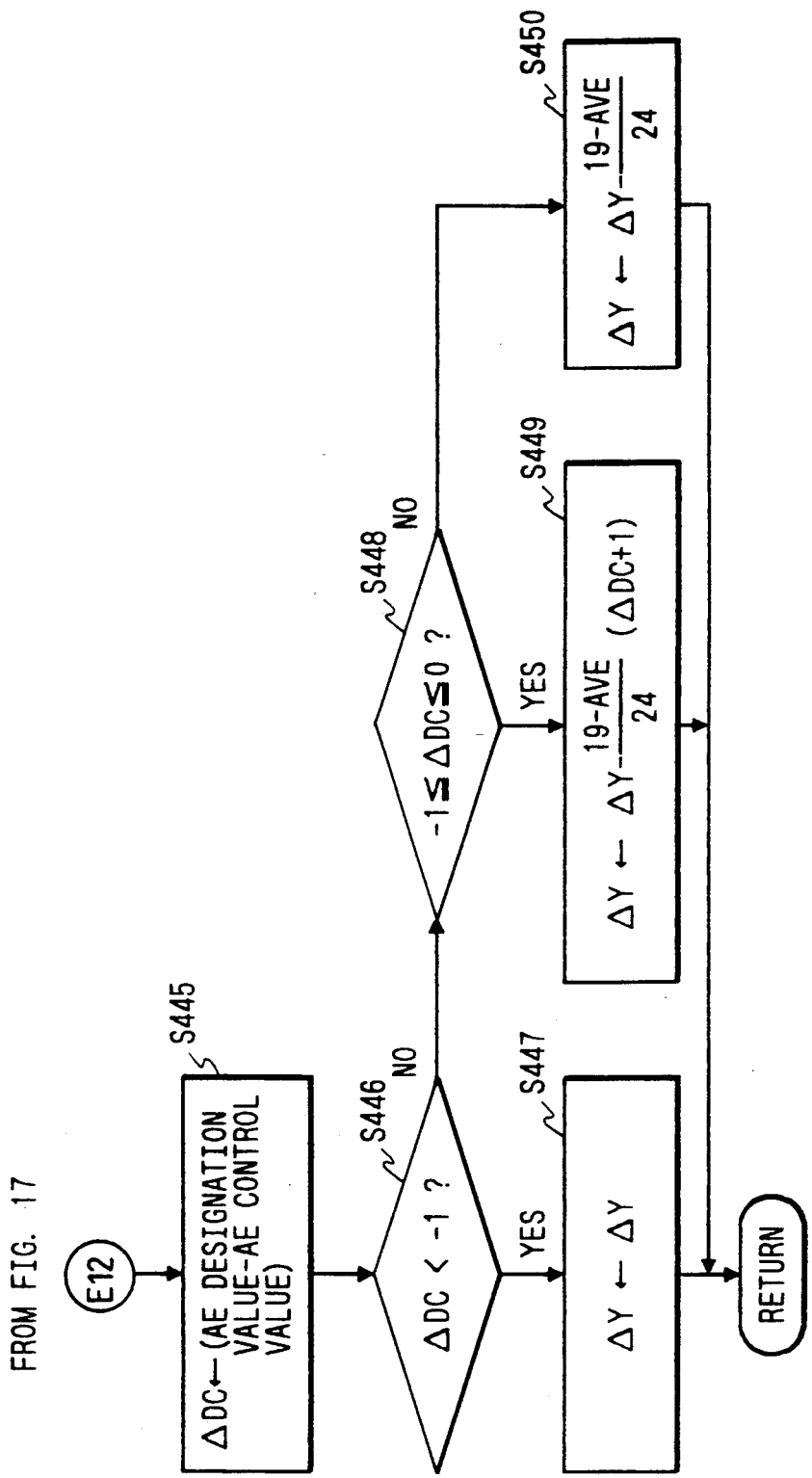
FIG. 18 is a flowchart to show a routine for determination of light adjusting area and for calculation of light adjusting correction amount.

ΔDC is obtained at Step S445 of FIG. 18 by subtracting an AE control value actually controlled, from an ideal exposure value of stationary light calculated by the camera, or a designation value of automatic exposure device as hereinafter called as AE. Here, the case that ΔDC is not 0, is a case of photographing by the manual exposure, or a case in which a flash timing reaches a limit out of a range of synchronization. The correction amount ΔY is again corrected at Steps S446-S450 in response to the value of ΔDC. It is judged at Step S446 whether ΔDC is smaller than −1. If it is smaller than −1, the flow proceeds to Step S447, while if not, the flow proceeds to Step S448. ΔDC smaller than −1 means that the stationary light is controlled under 1 EV, and no further correction is effected at Step S447 to maintain the light adjusting correction amount ΔY as it is. It is judged at Step S448 whether −1≦ΔDC≦0. If affirmed, the flow proceeds to Step S449, while if negated, the flow proceeds to Step S450. The light adjusting correction amount ΔY is calculated at Step S449 by the following equation.

$$\Delta Y = \Delta Y - ((19 - AVE)/24) \times (\Delta DC + 1) \qquad (16),$$

where AVE represents an average value of luminance values BV (n) (n=1-5) of stationary light detected by the light metering element for exposure control 8.

In the above equation (16), the flash amount of flash apparatus is corrected to decrease by an amount of illumination of stationary light onto the main subject. Therefore, as it becomes darker, or as ΔDC becomes larger, the light adjusting correction amount ΔY is corrected more negative. Further, if Step S448 is negated, or, if ΔDC is positive, the light adjusting correction amount ΔY is calculated at Step S450 by the following equation.

$$\Delta Y = \Delta Y - ((19 - AVE)/24) \qquad (17)$$

The flow returns to the main program after the above processes.

FIGS. 19 and 20 are flowcharts to show the main flash process at step S20 of FIG. 7.

The area number n is reset at Step S501, and the number n is given an increment at step S502. It is judged at Step S503 whether the area of area number n is designated as the light adjustment intended area. If affirmed, the flow proceeds to Step S504, while if negated, the flow proceeds to Step S505. The gain Ghon (n) for the gain setters of light adjusting circuit 50 is calculated at Step S504 by the following equation using the light adjusting correction amount ΔY calculated at the above Step.

$$Ghon(n) = \gamma(SV + \log_2(1/Mval) - S\beta - \Delta Y) \quad (18),$$

where SV is an ISO speed of film, Sβ a lens correction factor, ΔY a light adjusting correction amount, and γ a constant.

If it is judged at Step S503 that the area is not the light adjusting area, a fully small value, for example −10, is set as the gain Ghon (n) at Step S505. It is judged at Step S506 whether n=5. If negated, the flow returns to Step S502 to repeat the above processes. If affirmed, the flow proceeds to Step S407 of FIG. 20.

By the above processes, the gains Ghon (1)-Ghon (5) are set in the gain setters 52a-52e, respectively.

The main flash of electronic flash apparatus 11 is started at Step S507 of FIG. 20. The light metering is carried out at the following Step S508. Illumination light of the main flash is reflected by the subject, passes through the photographic lens 2, is reflected at the film plane, and is then received by the five light receiving element segments 13a-13e. Light metering signals IG (1)-IG (5) of light receiving element segments 13a-13e are input into the amplifiers 51a-51e of light adjusting circuit 50. The amplifiers 51a-51e amplify the light metering signals IG (1)-IG (5) by the gains Ghon (1)-Ghon (5) set by the gain setters 52a-52e, then to output the amplified signals to the adder 54. The adder 54 adds these input amplified signals. The integrating circuit 55 integrates with time the addition result of adder 54 or summation of amplified light metering signals IG (1)-IG (5), designating the value as IG at Step S509.

A preliminarily set light adjustment level is output from the CPU 31 to the converting circuit 56. The converting circuit 56 converts the level into an analog signal. The thus-converted light adjustment level LV and the output IG of the integrating circuit 55 are output to the comparator 57. The comparator 57 compares the output IG with the light adjustment level LV at Step S510. If the output IG does not reach the light adjustment level LV, the flow returns to Step S508. If it reaches the light adjustment level, the flow proceeds to Step S511 to stop the main flash by controlling the flash controlling circuit 38 of electronic flash apparatus 11.

According to the above-explained proceedings, the gain Ghon (n) is obtained based on the light adjusting correction amount ΔY, and if ΔY>0, the flash stop timing of main flash is delayed to increase the flash light amount as the correction amount increases. If ΔY<0, the flash stop timing of main flash is advanced to decrease the flash light amount as |ΔY| increases.

As explained above, the light metering value upon the preliminary flash is corrected by eliminating from the light metering value upon the preliminary flash the stationary light component excluding the light emitted from the flash apparatus and reflected in the photographic field, the light adjusting correction amount upon the main flash is calculated based on the corrected light metering value, and the light adjustment of the main flash of flash apparatus is carried out with the light adjusting correction amount, so that a distribution and an intensity of reflection light of flash from an object present in the field to be photographed may be accurately obtained thereby to achieve accurate light adjustment of main flash.

Further, the stationary light component is metered when the preliminary flash is not effected, and the light metering of stationary light component is conducted in the same time as the time required for the light metering of preliminary flash, so that the stationary light component may be accurately detected thereby to achieve accurate light adjustment of main flash.

Further, when the light metering value is negative after the preliminary light component is eliminated from the light metering value upon the preliminary flash, the light metering value after the correction is set to be a positive minimal number or 0, thereby to avoid abnormal light adjustment due to the negative light metering value, which cannot be normally present.

It should be noted that the number of segments of the light metering element for exposure calculation and of the light receiving element for light adjustment is not limited to that in the above embodiment, and that the number could be 1-4, or more than 5. Further, the number of segments of the light metering element for exposure calculation may differ from that of the light receiving element for light adjustment.

In the above embodiment, the light adjusting correction amount upon the main flash is calculated based on the light metering value upon the preliminary flash corrected by the elimination of stationary light component, the amplification gains of light metered value upon the main flash are set based on the light adjusting correction amount to amplify the light metered value upon the main flash, and the main flash is stopped when the time integration thereof reaches the preliminarily set light adjustment level. Arranging this, the light adjustment level may be corrected based on the light metered value upon the preliminary flash corrected by elimination of stationary light component, and a comparison may be made between the corrected light adjustment level and the time integration of light metered value upon the main flash.

As explained above, according to the present invention, the light metered value upon the preliminary flash is corrected by eliminating from the light metered value upon the preliminary flash the stationary light component excluding the light emitted from the flash apparatus and reflected in the photographic field, the light adjusting amount upon the main flash is calculated based on the corrected light metered value, and the main flash of flash apparatus is adjusted using the light adjusting amount, so that the distribution and the intensity of reflection light of flash from an object present in the field to be photographed may be accurately obtained to effect the accurate light adjustment of main flash.

Also according to the present invention, since the stationary light component excluding the light emitted from the flash apparatus and reflected in the photographic field is metered when the preliminary flash is not carried out, the stationary light component may be accurately detected thereby to allow accurate light adjustment of main flash. Further, the light metering and the correction are conducted through the same optical system during the preliminary flash and during other processes, obtaining a high precision of light adjustment.

According to the present invention, the stationary light component is metered in the same time as that required for light metering of preliminary flash, so that the stationary light component may be accurately detected thereby to effect further accurate light adjustment of main flash.

Further, according to the present invention, if the light metered value is negative after the elimination of preliminary light component from the metered value upon the preliminary flash, the metered value after the correction is set to a negative minimal number or 0, so that abnormal light adjustment due to a negative metered value, which is normally unreal, may be avoided.

According to the present invention, the light metering is conducted by segmenting the photographic field into plural areas, the light metered value is corrected by eliminating the stationary light component from the light metered value of each light metering area, and the light adjustment of the main flash is effected based on the corrected light metered value of each area, so that further accurate light adjustment of main flash may be achieved similarly as above.

What is claimed is:

1. A camera provided with an automatic light adjusting device for adjusting a flash apparatus which performs a preliminary flash before a main flash, comprising:

a flash apparatus for performing a preliminary flash before a main flash;

light metering means for at least metering a light which is emitted from said flash apparatus and reflected by a photographic field;

light metered value correcting means for correcting a light metered value upon said preliminary flash by eliminating a component of stationary light excluding the light emitted from said flash apparatus and reflected by said photographic field, from the light metered value upon said preliminary flash which is metered by said light metering means; and light adjusting means for adjusting the main flash of said flash apparatus based on said light metered value corrected by said light metered value correcting means.

2. A camera according to claim 1, wherein said light metering means performs the light metering of said stationary light component when said preliminary flash is not performed.

3. A camera according to claim 1, wherein said light metering means performs the light metering of said stationary light component within the same time period as that required for the light metering of said preliminary flash.

4. A camera according to claim 1, wherein said light metered value correcting means sets a positive minimal value or zero as a corrected light metered value when the light metered value upon said preliminary flash of said light metering means is negative after the elimination of said stationary light component.

5. A camera according to claim 1, wherein said light metering means at least meters the light emitted from said flash apparatus and reflected by the photographic field using a plurality of segmented areas of said photographic field, said light metered value correcting means corrects a light metered value for each area by eliminating the stationary light component excluding the light emitted from said flash apparatus and reflected by said photographic field, from a light metered value upon said preliminary flash of each area, and said light adjusting means adjusts the main flash of said flash apparatus based on the corrected light metered values of said areas.

6. A camera according to claim 1, wherein said light metered value correcting means corrects the light metered value when a brightness of said stationary light component is not more than a predetermined value.

* * * * *